(12) United States Patent
Lunghofer et al.

(10) Patent No.: US 6,753,299 B2
(45) Date of Patent: Jun. 22, 2004

(54) COMPOSITE SILICA PROPPANT MATERIAL

(75) Inventors: Eugene P. Lunghofer, Youngstown, NY (US); Larry A. Wolfe, Tonawana, NY (US)

(73) Assignee: Badger Mining Corporation, Berlin, WI (US)

( * ) Notice: Subject to any disclaimer, the term of this patent is extended or adjusted under 35 U.S.C. 154(b) by 190 days.

(21) Appl. No.: 10/035,960

(22) Filed: Nov. 9, 2001

(65) Prior Publication Data

US 2003/0148893 A1 Aug. 7, 2003

(51) Int. Cl.[7] .......................... C09K 3/00; C04B 35/03; E21B 43/26
(52) U.S. Cl. ...................... 507/269; 507/906; 507/924; 166/280; 166/308; 501/127; 501/128; 501/129; 501/130; 501/131; 501/133
(58) Field of Search ................................ 507/269, 924, 507/906; 166/280, 308; 501/127, 128, 129, 130, 131, 133

(56) References Cited

U.S. PATENT DOCUMENTS

| | | | |
|---|---|---|---|
| 4,440,866 A | 4/1984 | Lunghofer et al. | 501/127 |
| 4,476,098 A | 10/1984 | Nakamori et al. | 422/140 |
| 4,522,731 A | 6/1985 | Lunghofer | 252/8.55 |
| 4,658,899 A | 4/1987 | Fitzgibbon | 166/280 |
| 4,879,181 A | 11/1989 | Fitzgibbon | 428/402 |
| 4,944,905 A | 7/1990 | Gibb et al. | 264/62 |
| 5,030,603 A | 7/1991 | Rumpf et al. | 501/127 |
| 5,120,455 A | 6/1992 | Lunghofer | 252/8.551 |
| 5,188,175 A | 2/1993 | Sweet | 166/280 |
| 5,699,860 A | 12/1997 | Grundmann | 166/280 |
| 5,883,029 A | 3/1999 | Castle | 501/33 |
| 5,902,510 A | 5/1999 | Balbaa et al. | 219/698 |
| 5,977,529 A | 11/1999 | Willert-Porada et al. | 219/698 |
| 6,066,290 A | 5/2000 | Dennis et al. | 419/38 |
| 6,074,533 A | 6/2000 | Tranquilla | 204/157.15 |
| 6,104,015 A | 8/2000 | Jayan et al. | 219/700 |
| 6,312,627 B1 * | 11/2001 | Molnar | 264/6 |

OTHER PUBLICATIONS

Recommended Practices for Evaluating Short Term Proppant Pack Conductivity, *American Petroleum Institute*, API Recommended Practice 61 (RP 61), First Edition, Oct. 1, 1989, pp. 1–21.

* cited by examiner

Primary Examiner—Philip C. Tucker
(74) Attorney, Agent, or Firm—Andrus, Sceales, Starke & Sawall, LLP

(57) ABSTRACT

An improved lightweight and highly permeable proppant composition for use in increasing the productivity of a gas or oil well. The proppant composition includes equal amounts by weight of uncalcined bauxite, uncalcined shale and quartz, held together with a binder formed of wollastonite and talc in an amount of less than 10% by weight of the composition. The proppant composition has an alumina content of less than 25% by weight of the composition and a silica content of over 45% by weight of the composition.

41 Claims, 38 Drawing Sheets

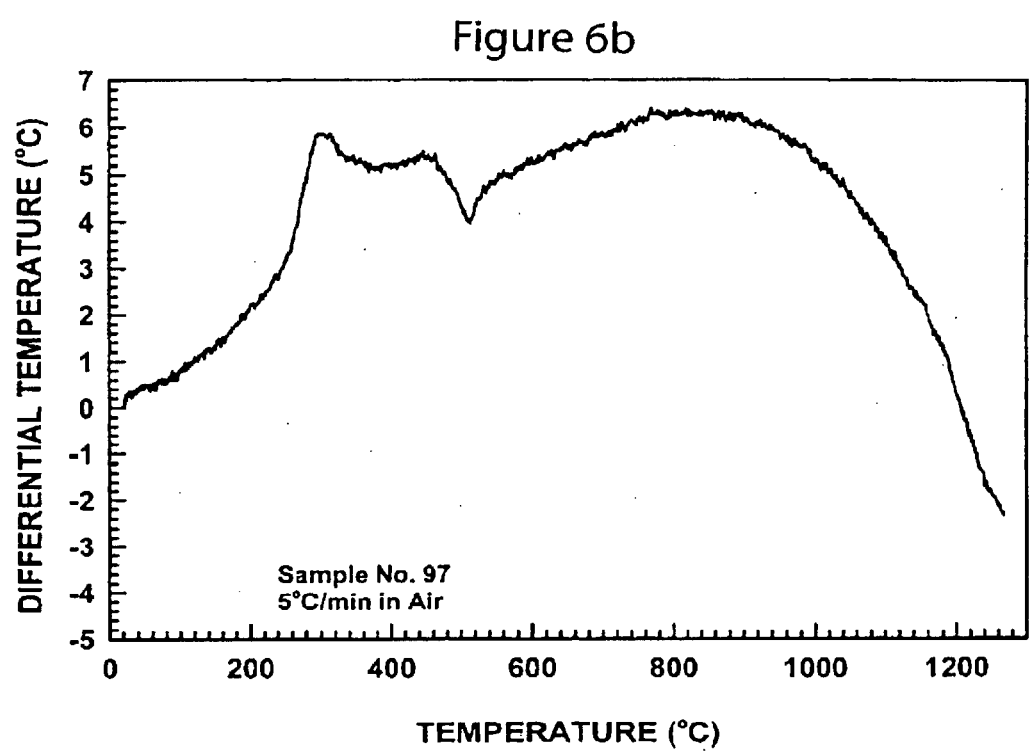

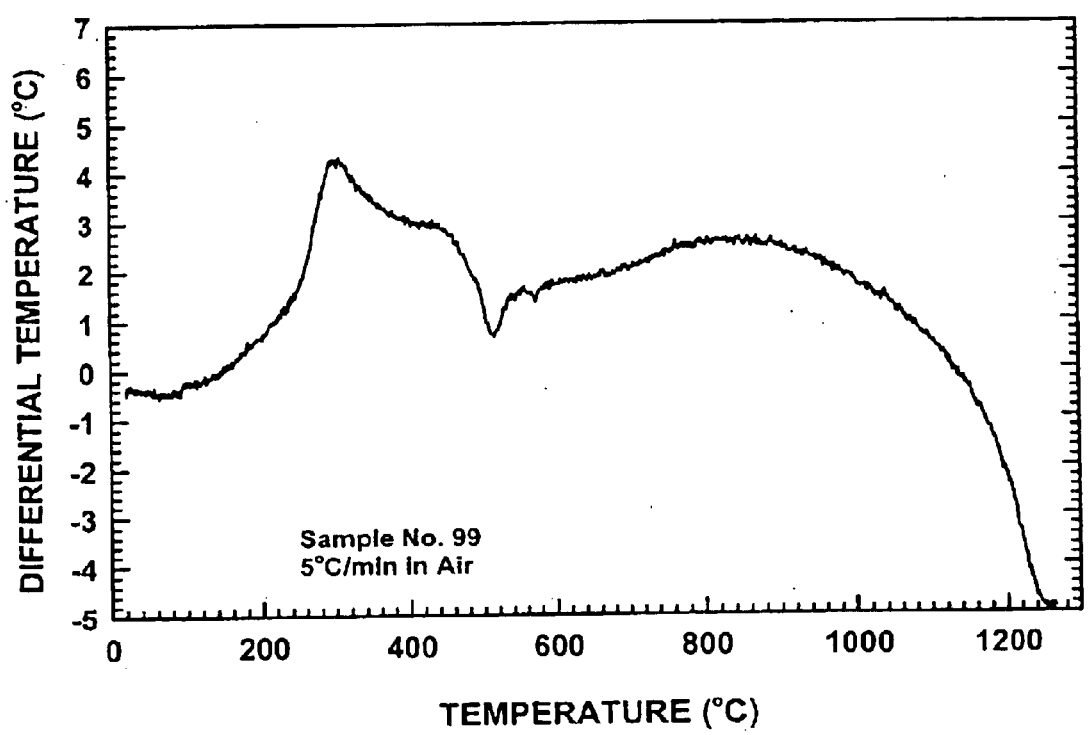

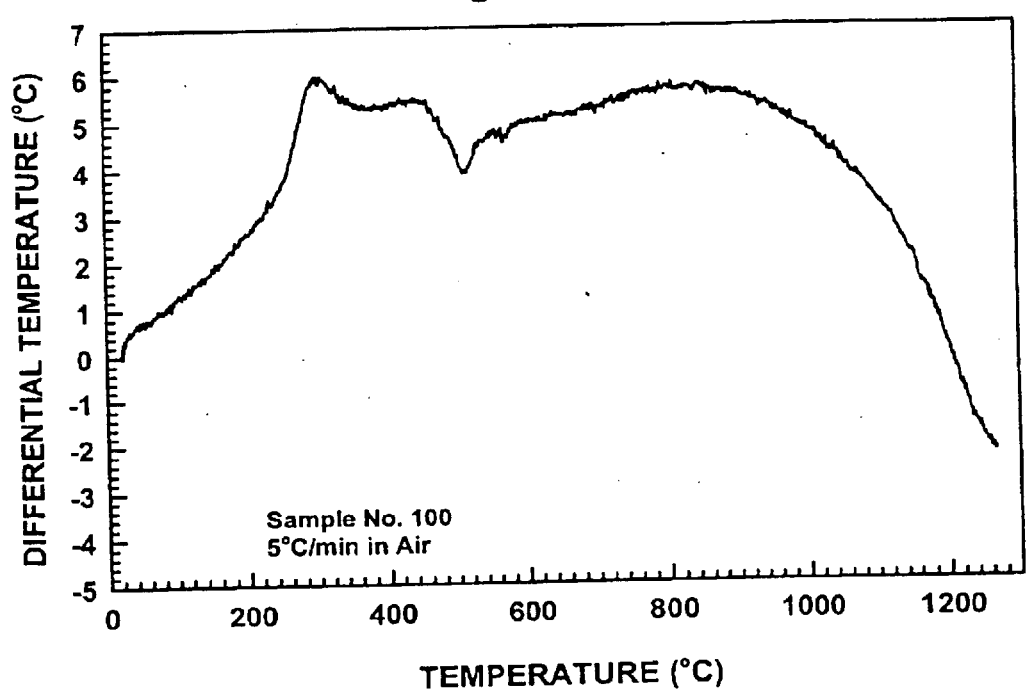

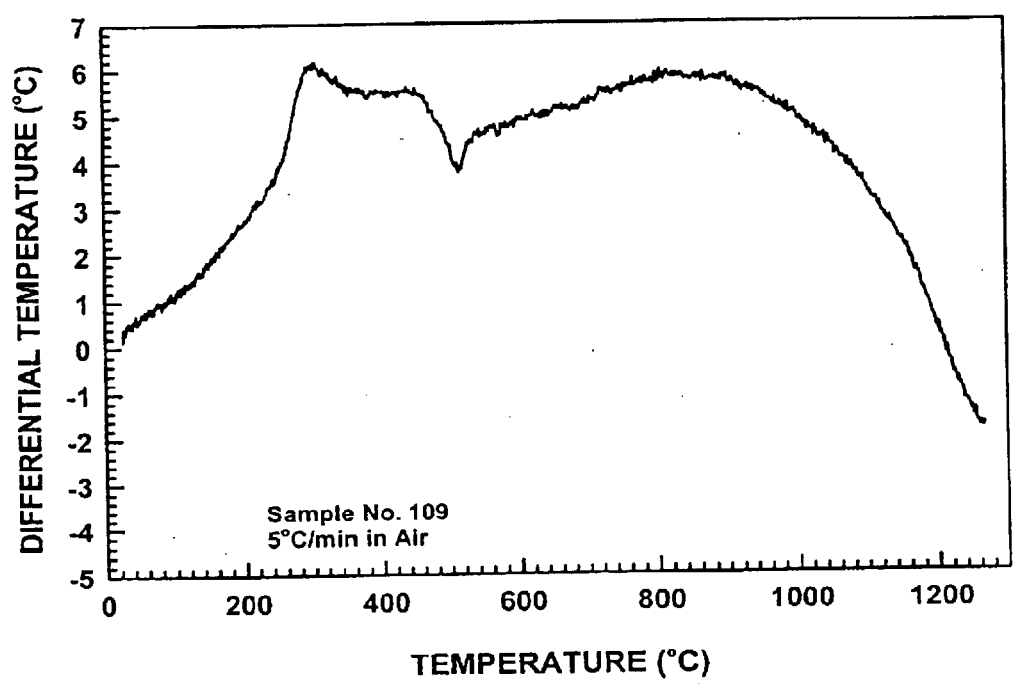

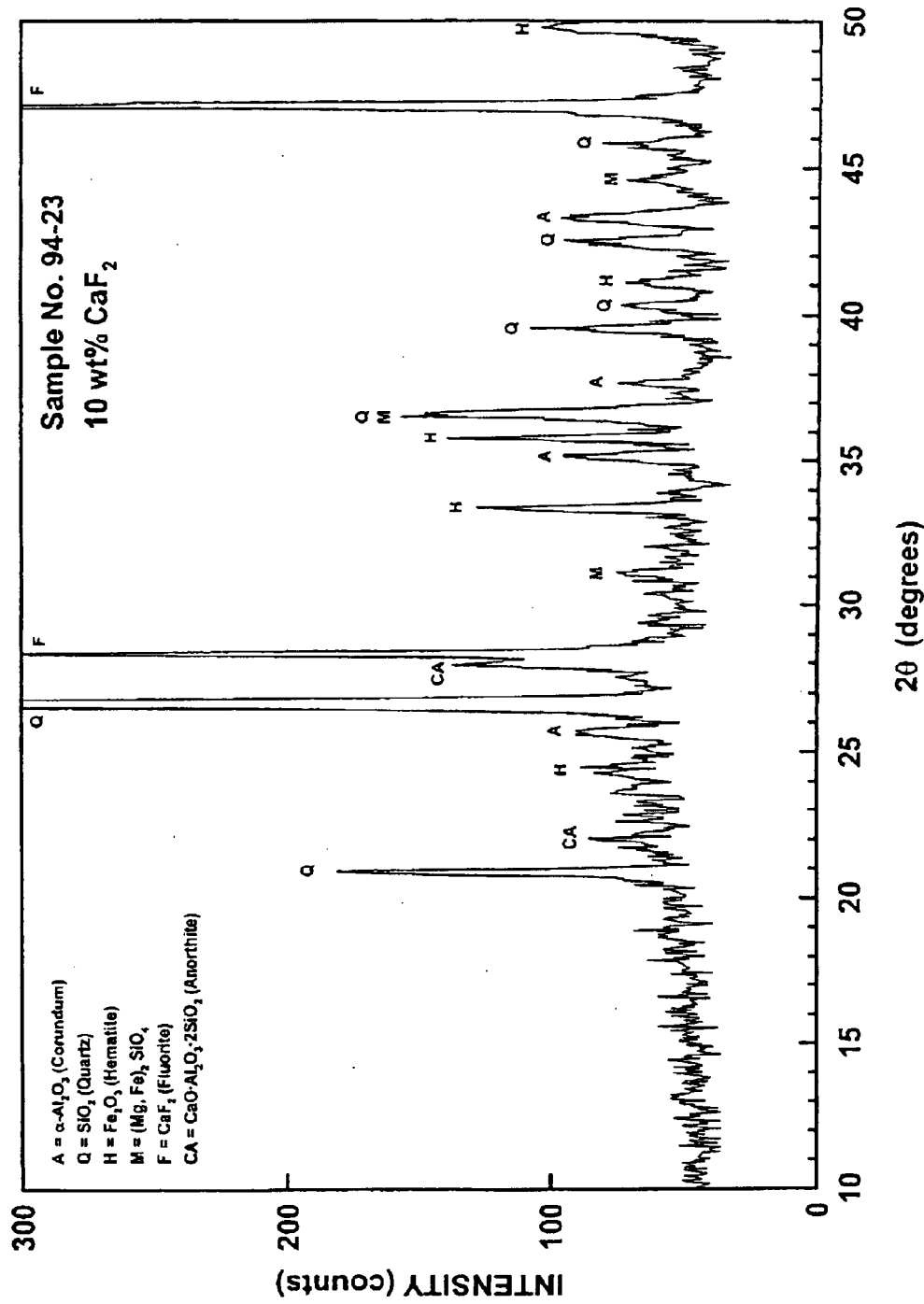

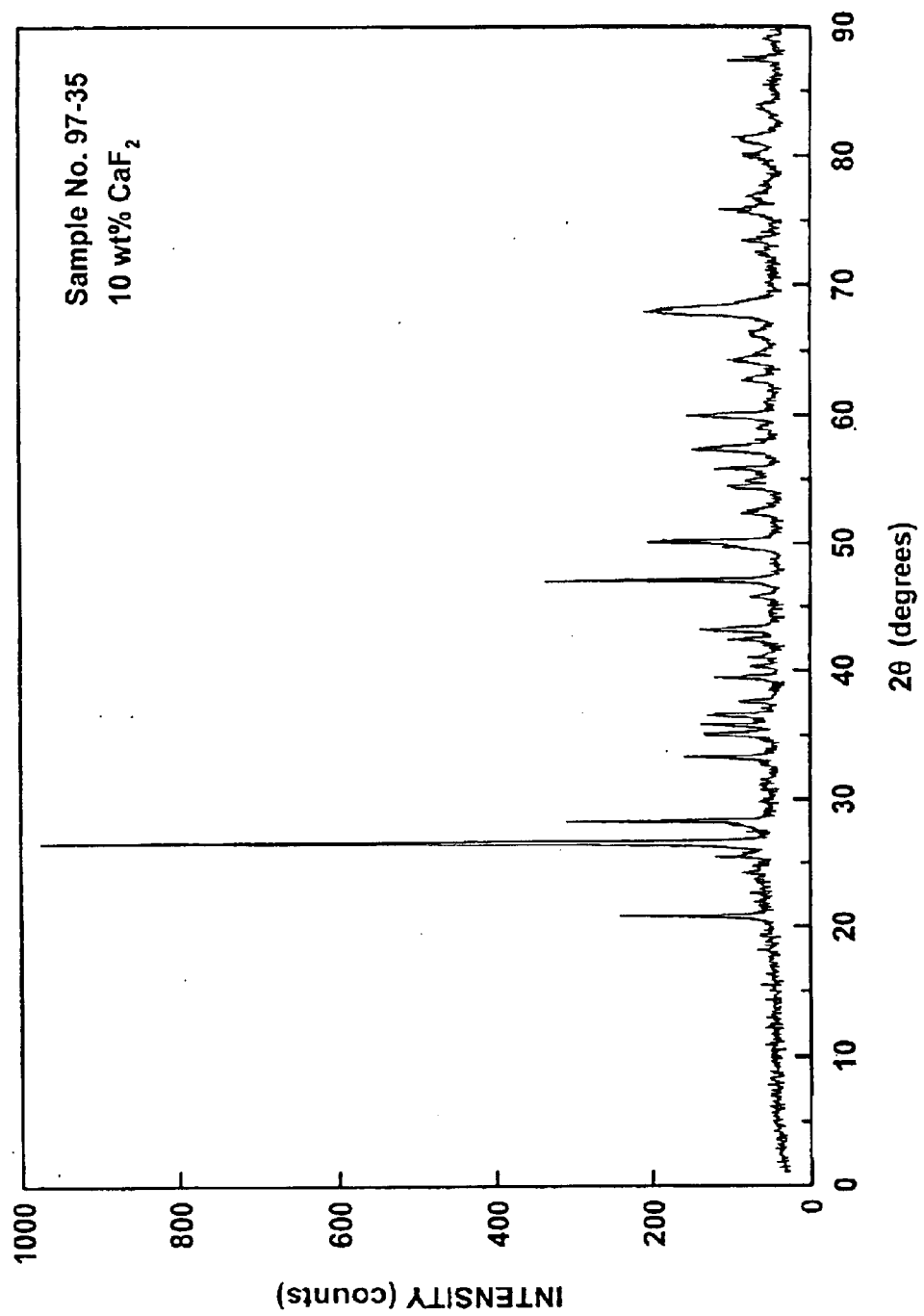

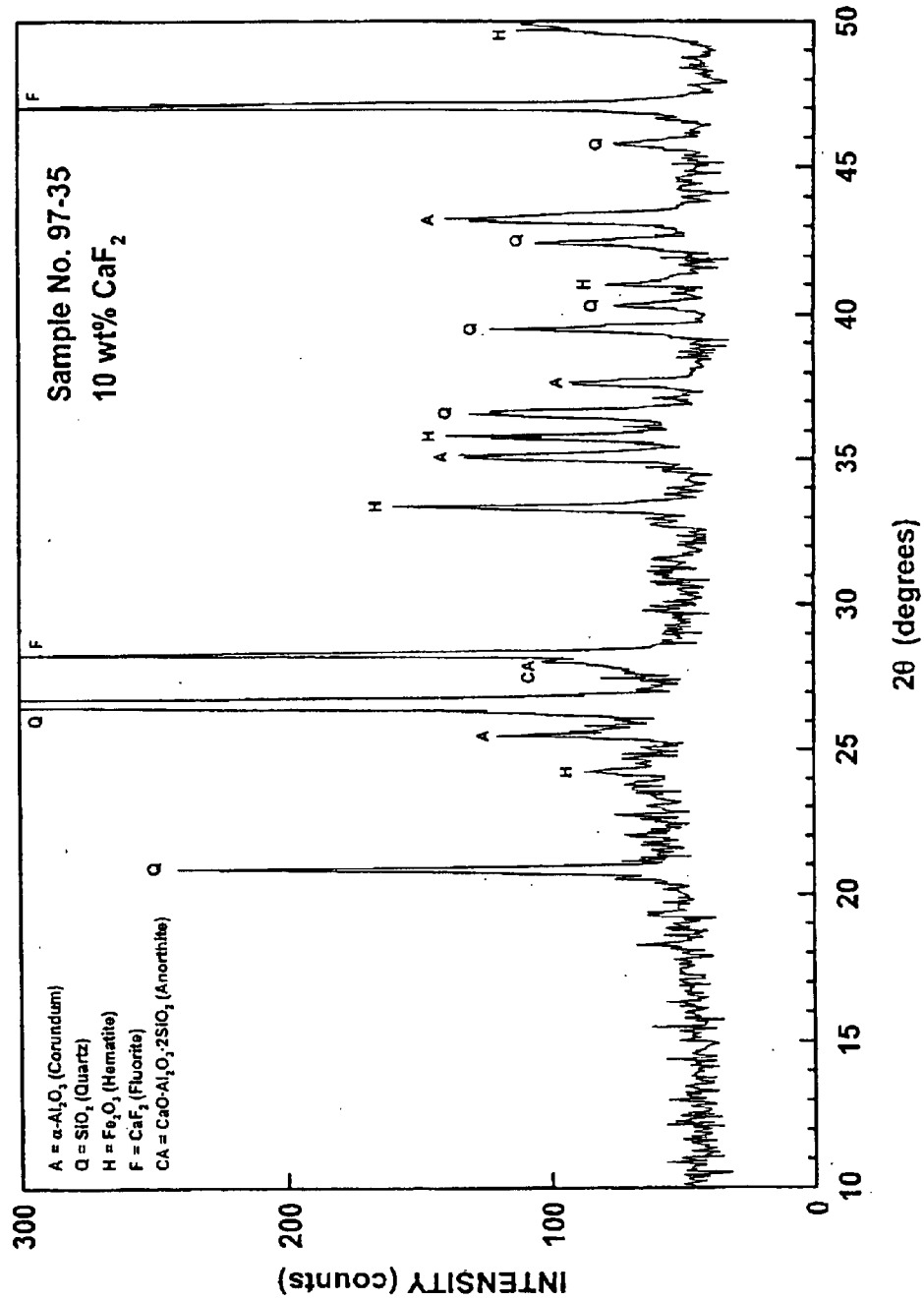

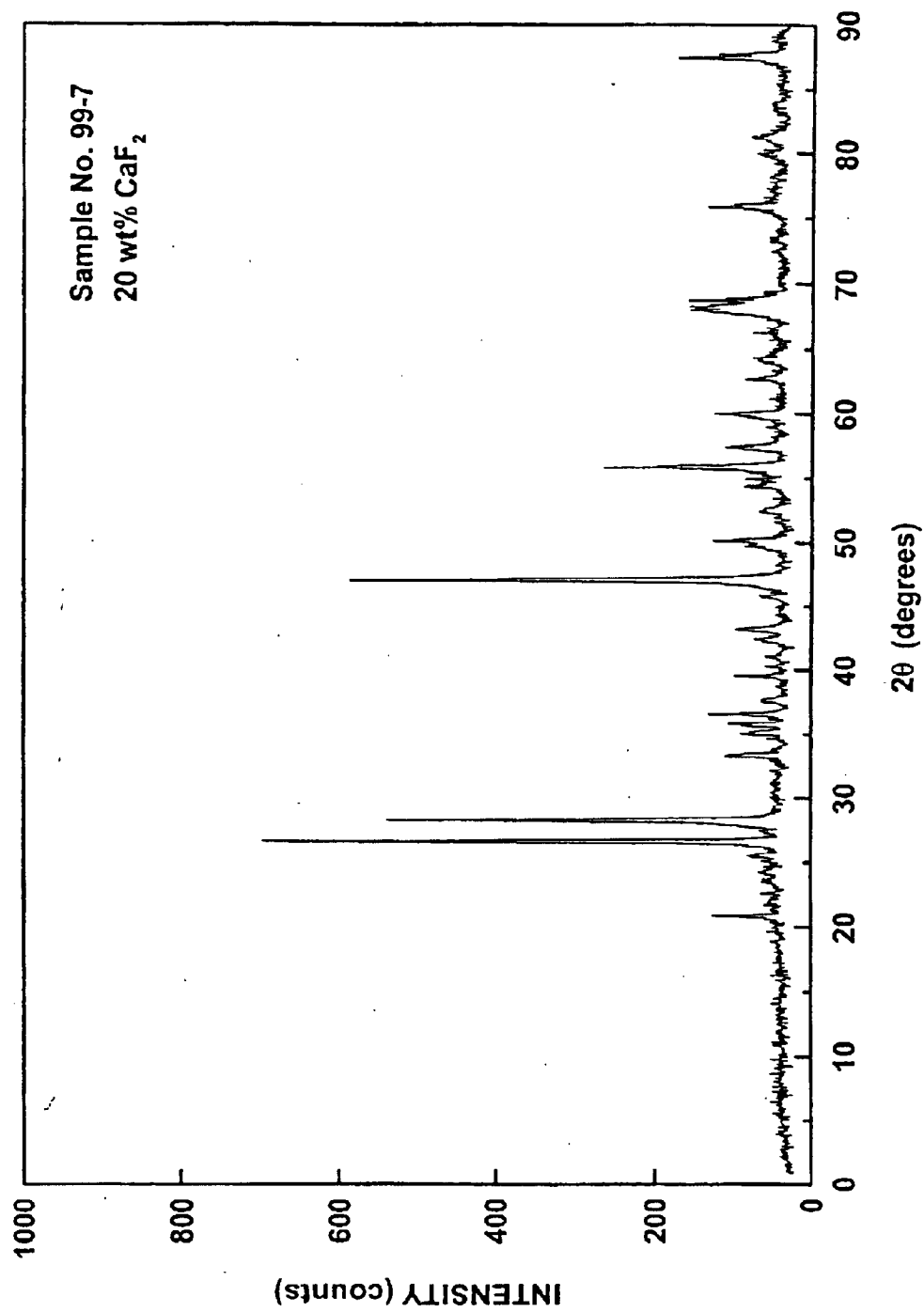

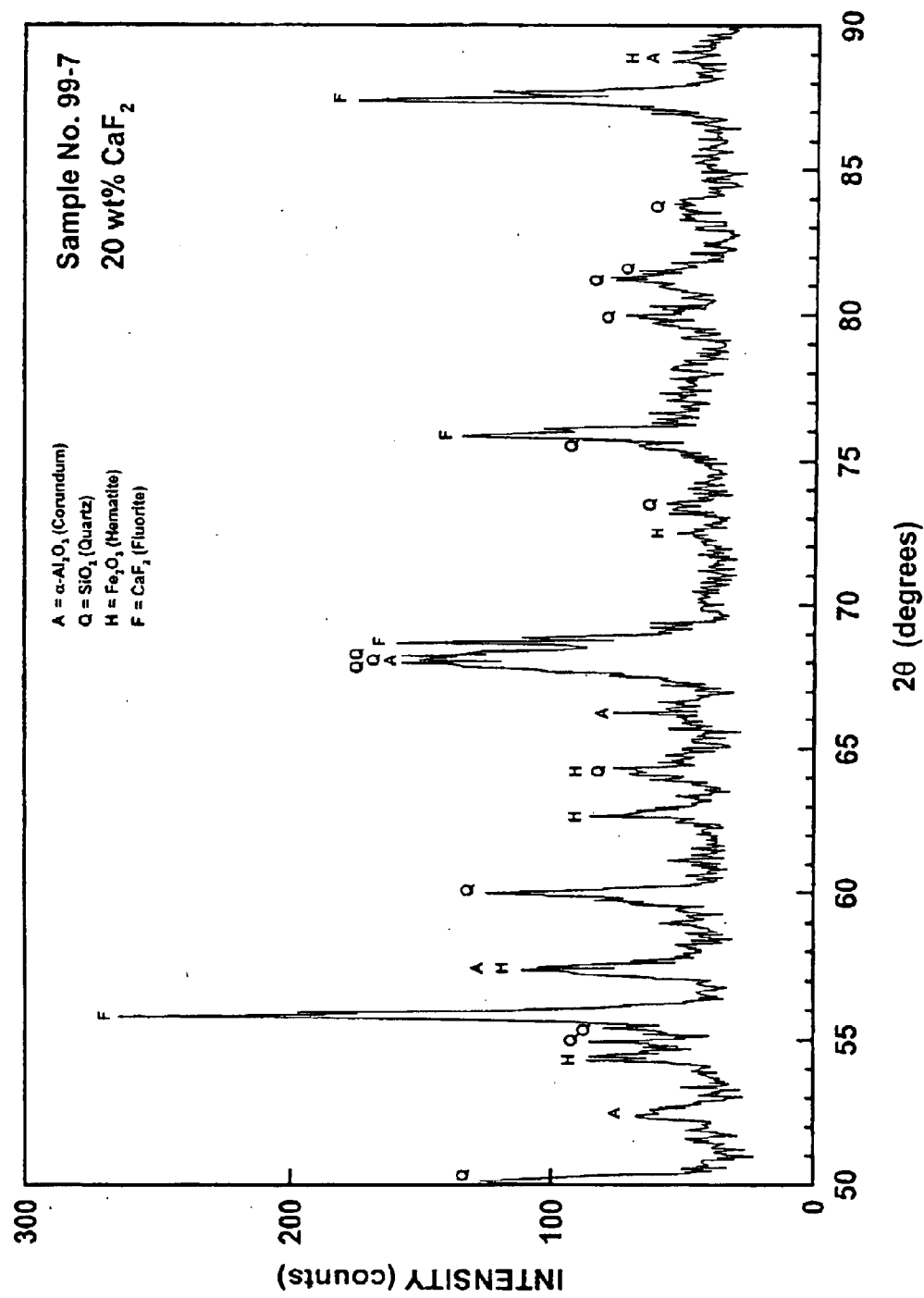

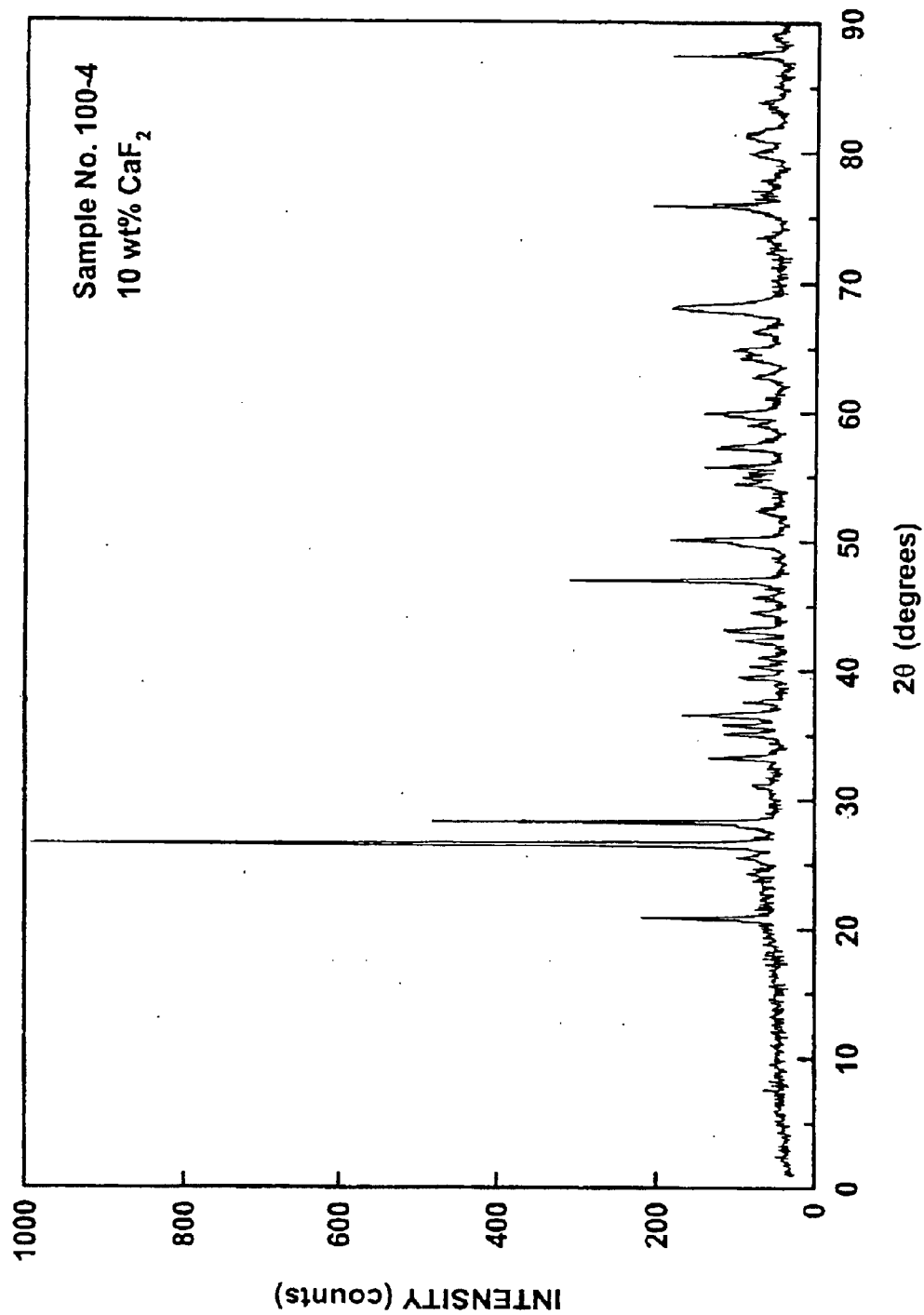

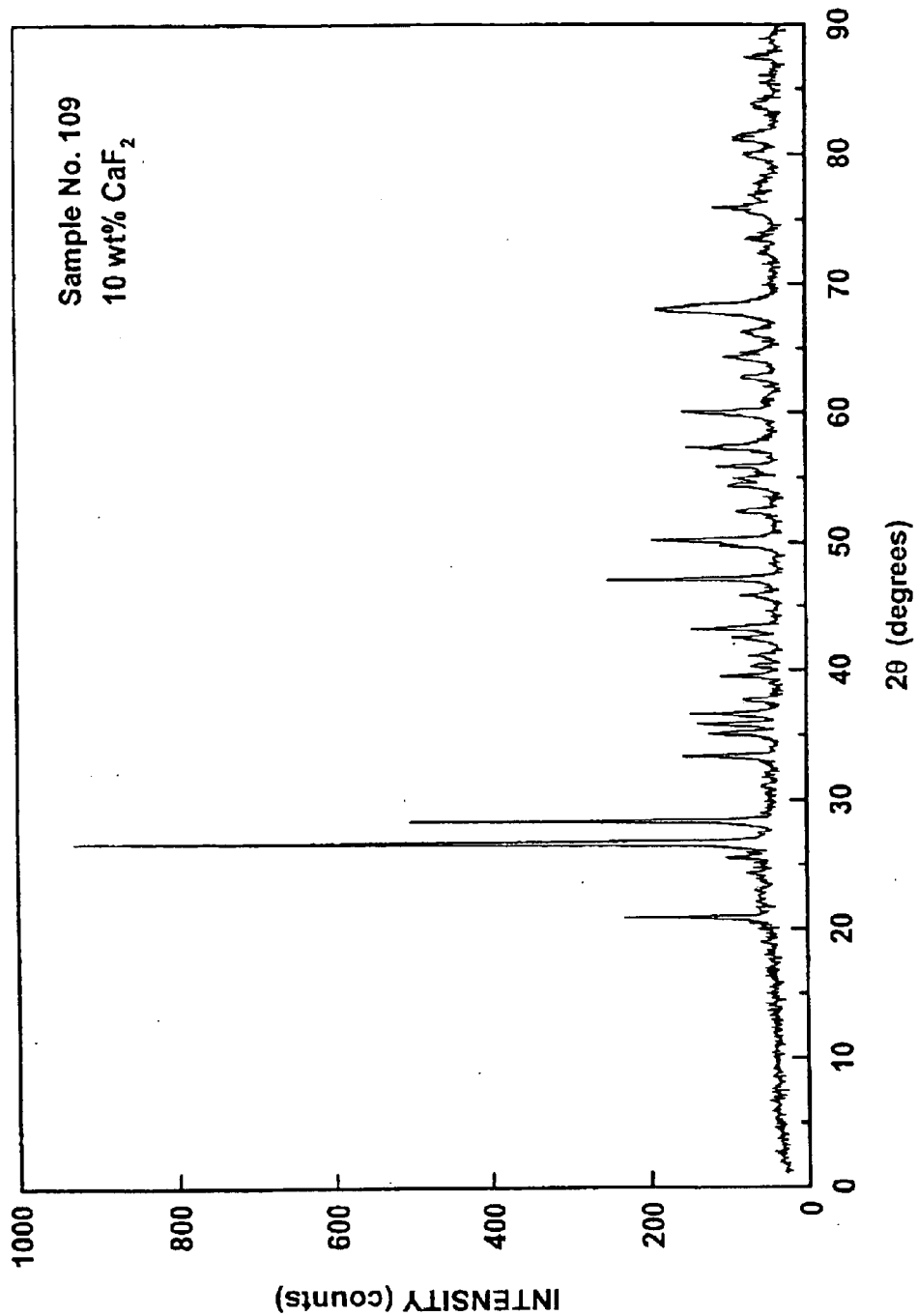

COMPOSITE SILICA PROPPANT MATERIAL

BACKGROUND OF THE INVENTION

The present invention relates to oil and gas well proppants and, more particularly, to sintered proppants made from ingredients which can be uncalcined, partially calcined or fully calcined, a method of making such proppants, and to a method of maintaining a fracture in a subterranean formation in a propped condition by utilizing such proppants.

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the permeability of the formation holding the gas or oil is insufficient for economic recovery of oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic pellets, which are carried into the fracture by means of a fluid, such as oil or water.

Spherical pellets of uniform size are believed to be the most effective proppant body shape due to maximized permeability. For this reason, assuming other properties to be equal, spherical or essentially spherical proppant bodies, such as rounded sand grains, metallic shot, glass beads and tabular alumina, are preferred. Examples of prior art proppants and their use are found in U.S. Pat. Nos. 2,950,247, McGuire, et al.; 3,026,938, Huitt, et al.; 3,126,056, Harrell; 3,497,008, Graham, et al.; 3,976,138, Colpoys, et al.; and 4,068,718, Cooke, et al.

There has been an evolution in the development of manmade proppants since the 1970's. The early manmade proppants were produced from high alumina based feedstocks such as bauxite, a material commonly used to produce high alumina bodies. Bauxite was a popular feedstock because it was readily available, many of the early producers had a good working knowledge of the material in conjunction with prior work in abrasives and refractories, and the cost was consistent with initial demands of the enhanced oil and gas recovery market. The early proppants had the advantage of high strength when compared with the traditional proppant, sand, used in hydraulic fracturing, a basic method of enhanced oil and gas recovery. The high strength of the alumina can be directly related to the high specific gravity and therefore bodies fabricated from these materials have high densities.

The hydraulic fracturing process requires that the proppant be suspended in a fluid and pumped under pressure into the well. To maintain the suspension of the proppant the viscosity of the fracturing fluid must be capable of keeping the proppant suspended. For deep wells, the high specific gravity and associated high viscosity required to adequately fracture a well, may be acceptable when maximum proppant strength is required. Not all oil and gas wells are of sufficient depth to require proppants with high strength. It is especially true of shallow depth wells that have been successfully enhanced by fracturing using sand as the propping agent.

By the late 1970's it became evident that there was a need for a proppant with lower density, lower cost, and the presumably lower strength. During the next two decades proppants became available with lower specific gravities. The density or specific gravity of these proppants was reduced by replacing the alumina content having a theoretical density of 3.95 grams per cubic centimeter with silica having a theoretical density of 2.5 grams per cubic centimeter. The original bauxite based proppants of the early 1970's contained >80% alumina (Cooke). Subsequent generations of proppants contained an alumina content of >70% (Fitzgibbons), 40% to 60% (Lunghofer), and later 30% to <40% (Rumpf, Fitzgibbons).

The other major element typically contained in proppants is silica. As mentioned above, the replacement of the alumina with the silica resulted in a proportionate drop in the density of the proppant material and a decrease in strength in most cases. It is believed that the proppant's strength was associated with the crystalline corundum phase, mullite phase, and/or silica-cristobalite phase (Rumpf). Many prior inventors expressed a desire to maintain the silica contained in the raw material and/or sintered proppants in either the amorphous phase or cristobalite phase. In addition, many prior inventors recommended that the quartz phase of silica was to be specifically avoided or limited in proppant compositions. The quartz phase is known to undergo an inversion at 573° C. from $\alpha$ to $\beta$ form during which a thermal expansion occurs upon heating and is reversed during cooling. Inversions of this type are often associated with cracking or inducing a stress in a quartz containing body subject to thermal treatment above the inversion temperature of 573° C.

As a result, it is desirable to develop a proppant having a composition with a highly reduced bauxite component. In addition, it is desirable that any such proppant material maintain relatively high permeability as well as high end strength so that it is capable of effective use in shallow as well as deep wells.

SUMMARY OF THE INVENTION

It is an object of the present invention to provide a proppant composition capable of being used as an oil and gas well proppant that includes a reduced amount of bauxite and/or alumina.

It is another object of the invention to provide a proppant composition that includes quartz as a material component of the composition.

It is still another object of the invention to provide a method for forming the above composition which can employ either a high intensity mixer or a spray fluidizing bed to form spherical pellets.

It is still a further object of the invention to provide a method for forming the proppant composition which sinters the spherical pellets utilizing a rotary kiln, a box kiln, or a fluidized microwave sintering bed.

The subject of this invention is a proppant using as its raw materials; quartz, shale containing quartz, bauxite, talc, and wollastonite. The resultant proppant made from such raw materials may contain as much as 65% quartz, and has yielded sufficient strength to be used in wells to a pressure of 10,000 pounds per square inch. Also, the resultant proppant has an alumina content of less than 25% by weight, and a silica content of greater than 45% by weight.

The quartz and shale representing >60% of the raw materials are inexpensive and readily available. Quartz is one of the most readily available and least expensive materials in the world. (Ref. *Crystalline Silica Primer*, U.S. Bureau of Mines, Dept. of the Interior, pp 11,12). The use of uncalcined bauxite, including the weight of the crystal water, represents <33% of the raw material required to produce the proppant and is of a low grade and is considered relatively inexpensive. The alumina content of the bauxite is low and contributes <25% and preferably <20% of the total proppant weight. The talc and wollastonite represent <10% of the raw material and are available on the world market to satisfy the desire to utilize low cost materials. The source of the silica may be from sand, clay (in the form of fine particles of hydrous aluminum silicates) and the bauxite.

The raw materials may contain low amounts of surface moisture that need not be removed. The surface moisture need only be remove if it is excessive or if the moisture removal is required by the preferred crushing and grinding method to prevent agglomeration. The raw material must be ground to an acceptable size, however there is no requirement to eliminate the crystal water by heat treatment of the raw material prior to crushing and grinding. The ground raw materials are blended and formed into spheres and are then thermally processed to increase the sphere's density and associated strength.

The high level of quartz and reduced amounts of bauxite and/or alumina in the proppant body combined with the ability to maintain the quartz phase and attain a high degree of physical strength after thermal processing at temperatures between 1150° C. and 1170° C. is considered unique. In addition, it has been found that it is possible to recycle the proppant body through the thermal processing cycle and enhance the strength of the proppant. The ability to recycle the proppant body through the thermal cycle and enhance its strength is considered a significant advantage. The ability to thermally recycle the proppant is not addressed in other patent literature and it is believed that at least some of the prior art proppant bodies do not respond to thermal reprocessing.

This invention differs from prior art in that the primary crystalline phase is a quartz, the secondary phases are hematite and α alumina. The bauxite is the source of the hematite and the a alumina. A tertiary interstitial phase of complex silicates binds the larger primary and secondary crystals. The addition of talc and wollastonite results in the formation of a magnesium iron silicate (spinel) phase and an anorthite feldspar phase respectively. There is an absence of amorphous glass, mullite, and the cristobalite phase of silica reported in prior art. The mullite and cristobalite are replaced by a quartz, a alumina, and hematite. The spinel and feldspar are interstitial crystalline phases between the primary and secondary phases and acting as a high strength binder. The iron content can be reduced by beneficiation of the bauxite or by the selection of a bauxite with a lower iron content.

In accordance with the present invention, a proppant composition and a method for forming the composition has been developed that forms pellets containing one or more preferably uncalcined or possibly partially or fully calcined ingredients in an alumina-to-silica dry weight basis ratio of from about 1:3 to about 1:2. The proppant composition includes a binder formed of wollastonite and talc that holds the components of the composition together in an unexpected manner to produce a proppant with good permeability, low density and reduced weight which is similar to other low-bauxite content proppants, but having a high end strength, which is similar to high-bauxite content proppants. Silver & Baryte uncalcined bauxite from Greece has been found to be particularly useful although bauxites from other sources may be employed.

The present invention thus provides a gas and oil well proppant comprising a mixture of from about 1% by weight to about 10% by weight talc, from about 1% by weight to about 10% by weight wollastonite, from about 5% by weight to about 33% by weight uncalcined bauxite, preferably from about 30% to about 32% by weight uncalcined bauxite, from about 10% by weight to about 65% by weight quartz, preferably from about 30% to about 32% by weight quartz, and from about 10% by weight to about 65% by weight uncalcined shale, preferably from about 30% to about 32% by weight uncalcined shale wherein the material has an alumina content of less than about 25% by weight, and a silica content of greater than about 45% by weight.

The materials which are particularly adapted for use to form the proppant composition of the present invention include uncalcined or partially calcined clays and uncalcined or partially calcined bauxites, shales and quartz. These materials are blended with the binder formed of wollastonite and talc to produce composite sinterable, spherical pellets. The pellets are subsequently heated to produce sintered, spherical pellets eminently useful as proppants. The composites of the present invention are preferably made from an uncalcined or partially calcined ingredients. However, the composites of the present invention can also be made from calcined ingredients.

The present invention also provides a process for propping fractures in oil and gas wells at depths of 6,000 to 14,000 feet utilizing the present sintered pellets by mixing the pellets with a hydraulic fluid, such as oil or water, and introducing the mixture into a fracture in a subterranean formation. The compaction pressure upon the fracture generally is at least 280 kg/cm$^2$ (4,000 psi) and usually is in the range of from about 350 to about 700 kg/cm$^2$ (5,000 to about 10,000 psi). The present pellets have an average particle size between 0.1 and 2.5 millimeters. It has been found that the present composite pellets containing 50 percent or more by weight quartz and held together by the wollastonite/talc binder have desirable permeability characteristics at pressures up to about 700 kg/cm$^2$ (10,000 psi). The true density of proppant of this invention has been measured at 2.623 gm/ml and 2.632 gm/ml for the 16/20 mesh size and 20/40 mesh sizes respectively. The loose packed bulk density has been measured at 1.51 gm/cc for the 16/20 mesh size proppant of this invention.

The present proppant materials are produced by forming a mixture comprised of dried but uncalcined, or partially calcined bauxite, shale, quartz, wollastonite, and talc. A temporary binder formed from the addition of starch is used to improve pelletizing and increase the green strength of the unsintered pellets. Each of the starting ingredients has an average particle size of less than about 15 microns and, preferably, less than about 10 microns.

In one preferred method, the mixture is produced on an intensive mixer having a rotatable table provided with a rotatable impacting impeller, such as described in U.S. Pat. No. 3,690,622, Brunner. Sufficient water is added to cause essentially spherical ceramic pellets to form within the mixer.

The unsintered pellets may also be formed by a spray-granulation process. In this process, the mixture of all of the ingredients used in forming the pellets is formed into an aqueous feed suspension including the mixture and the temporary binder. The feed suspension is subsequently atomized in a layer of partly dried particles that are fluidized in a stream of heated drying air. Finished particles are then removed from the fluidized layer and separated in order to recover particles having the desired size and shape.

BRIEF DESCRIPTION OF THE DRAWINGS

The following drawing figures illustrate the best mode currently contemplated of practicing the invention.

In the drawings:

FIGS. 6a–e are graphical representations of the results of a differential thermal analysis of samples of the proppant composition of the present invention;

FIGS. 8–8b are X-ray diffraction plots of a second sample of the proppant composition obtained during the first measurement;

DETAILED DESCRIPTION OF THE INVENTION

Figure 1A:
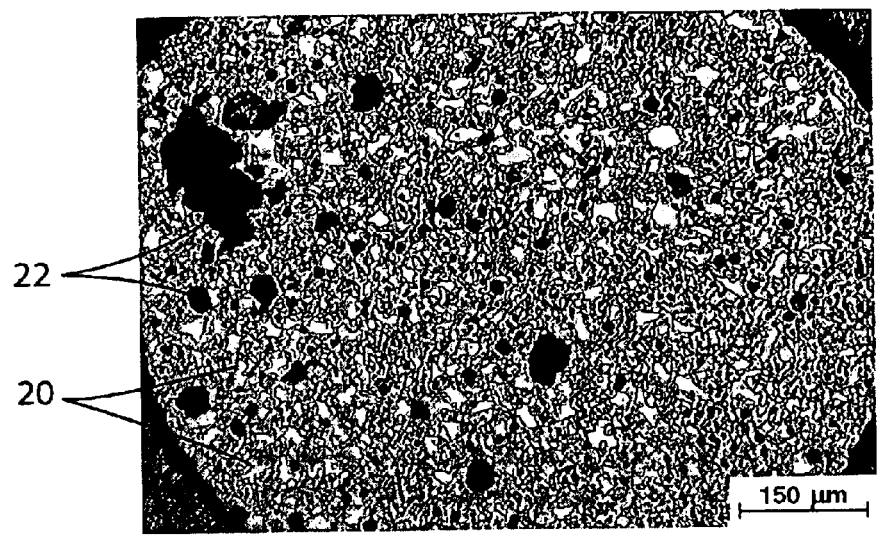
FIGS. 1a–f are scanning electron microscope (SEM) photomicrographs of sample proppant particles made pursuant to the present invention.
Figure 1B:
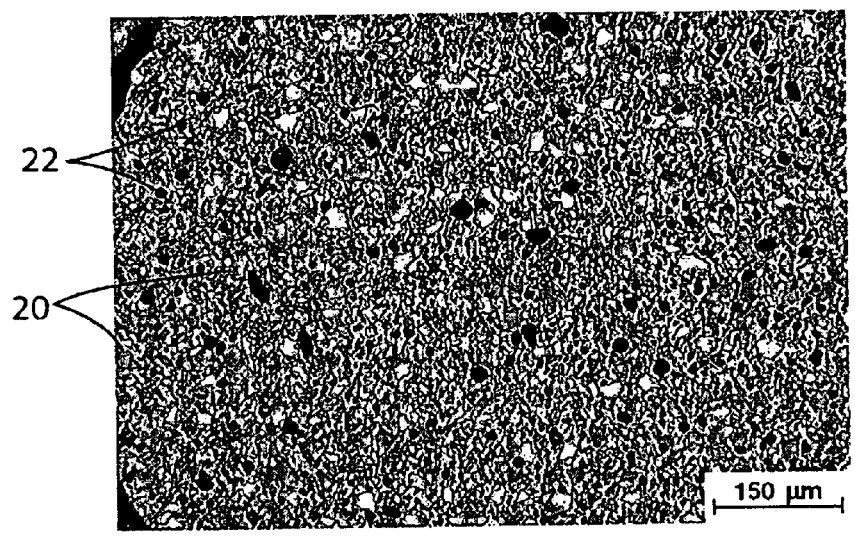
Figure 1C:
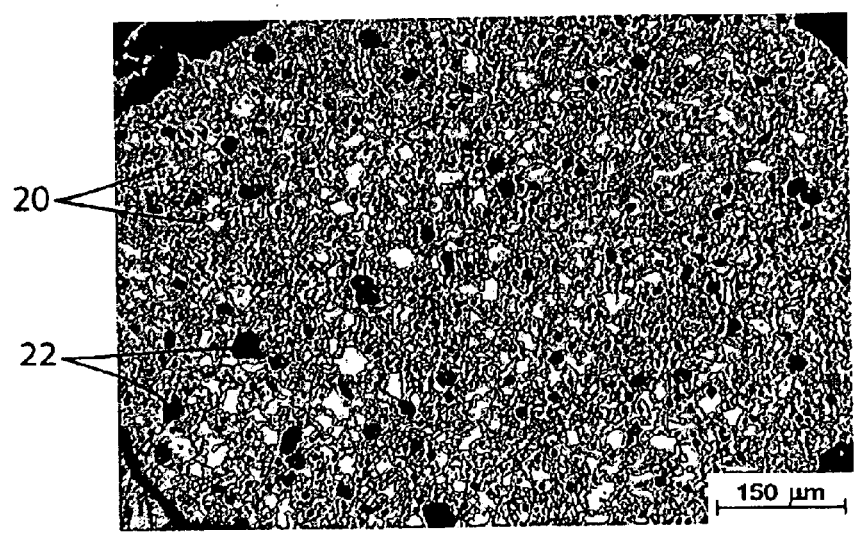
Figure 1D:
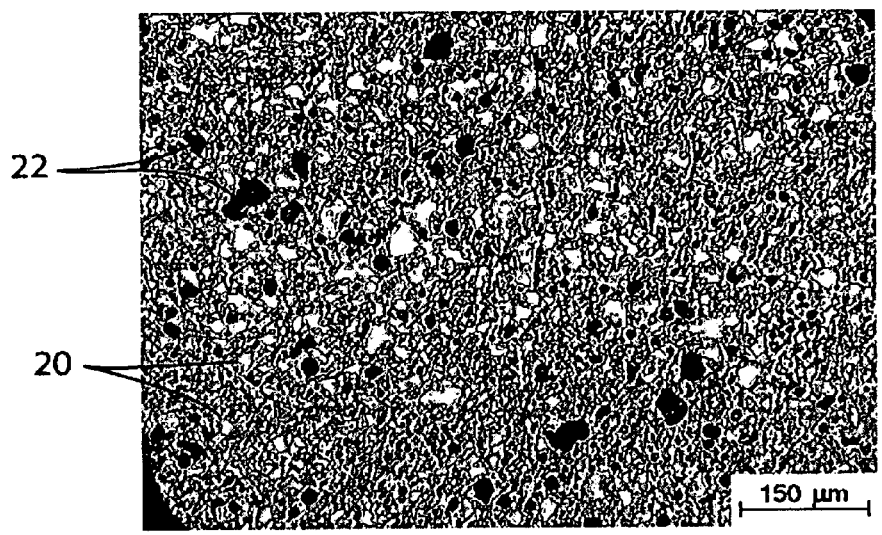
Figure 1E:
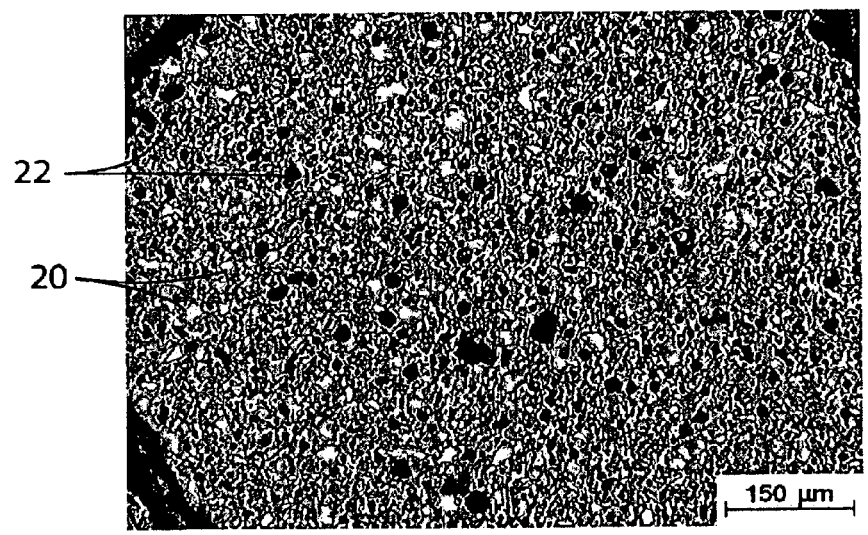
Figure 1F:
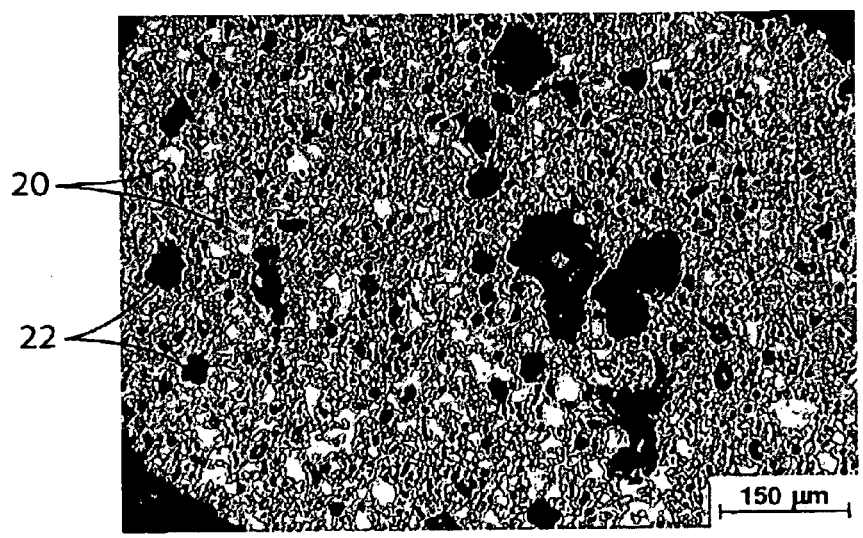
Figure 2A:
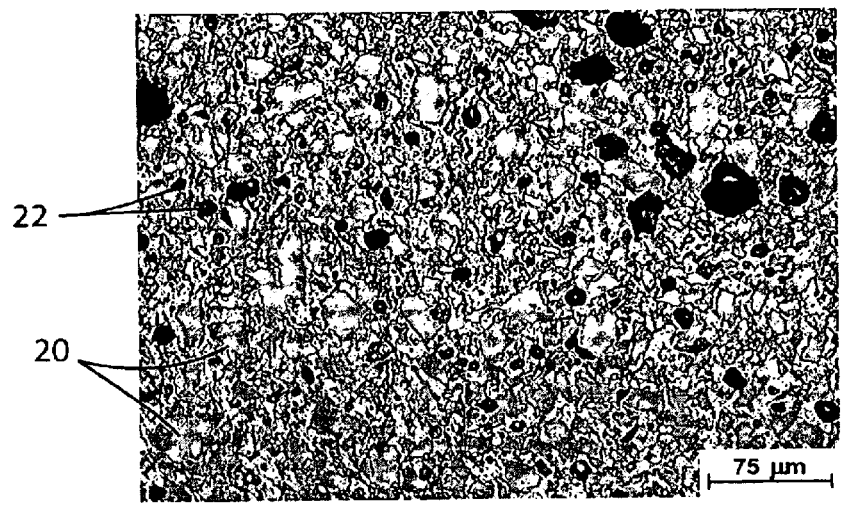
FIGS. 2a–f are SEM photomicrographs of cross sections of the particles of FIGS. 1a–f at a higher resolution than FIGS. 1a–f.
Figure 2B:
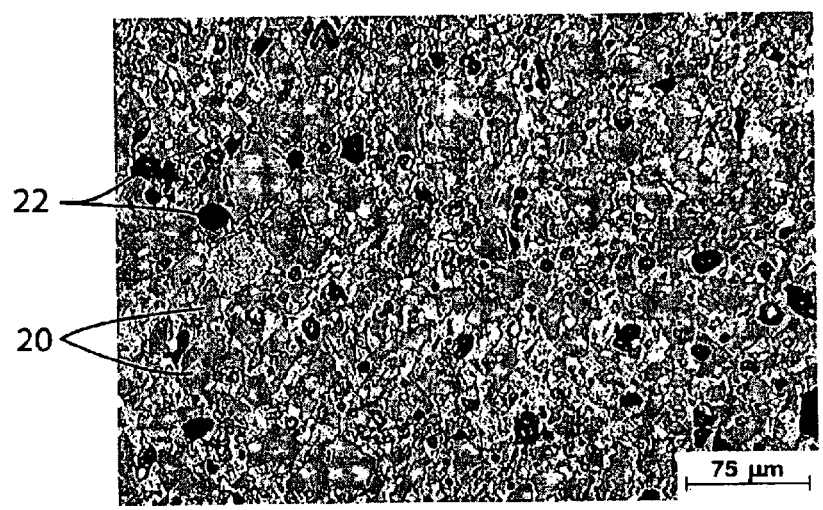
Figure 2C:
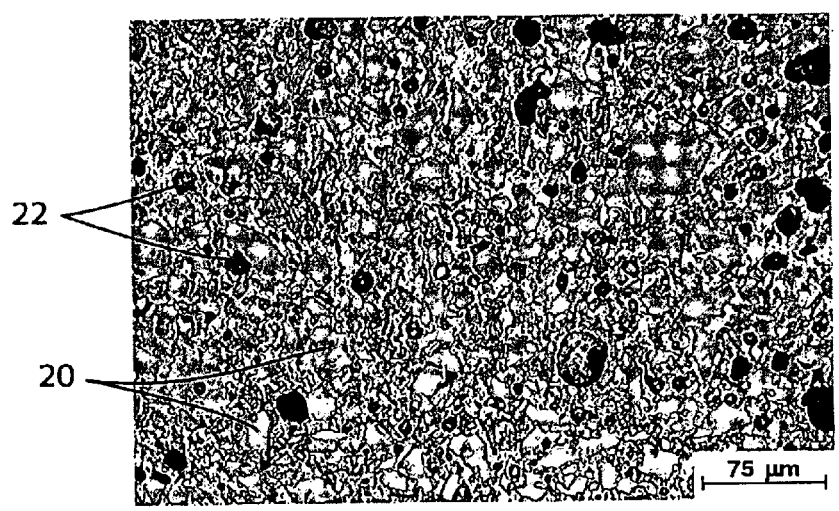
Figure 2D:
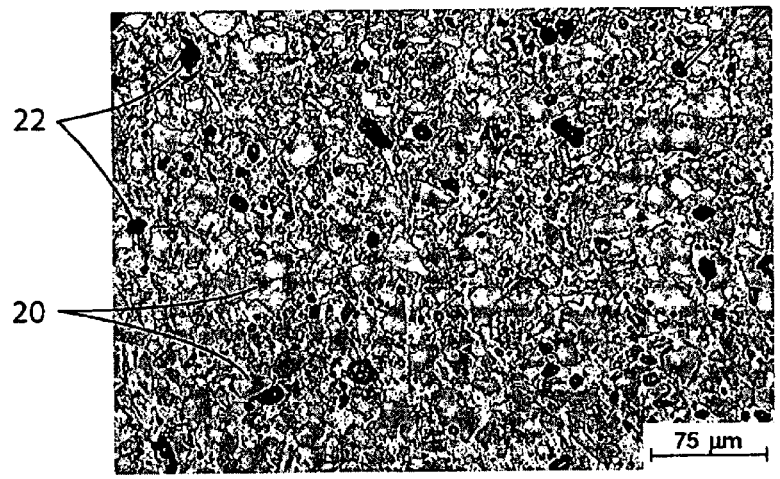
Figure 2E:
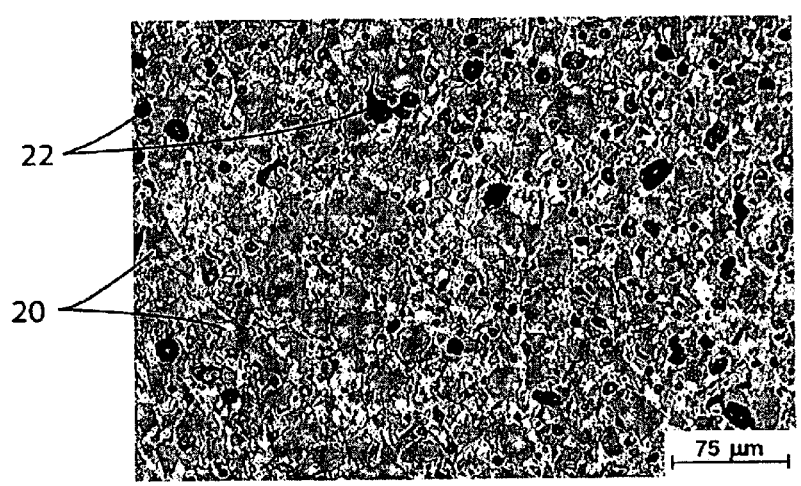
Figure 2F:
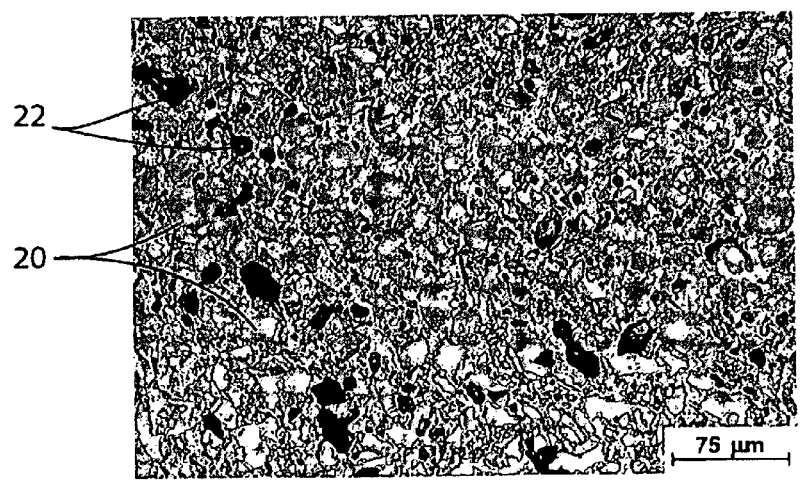
Figure 3A:
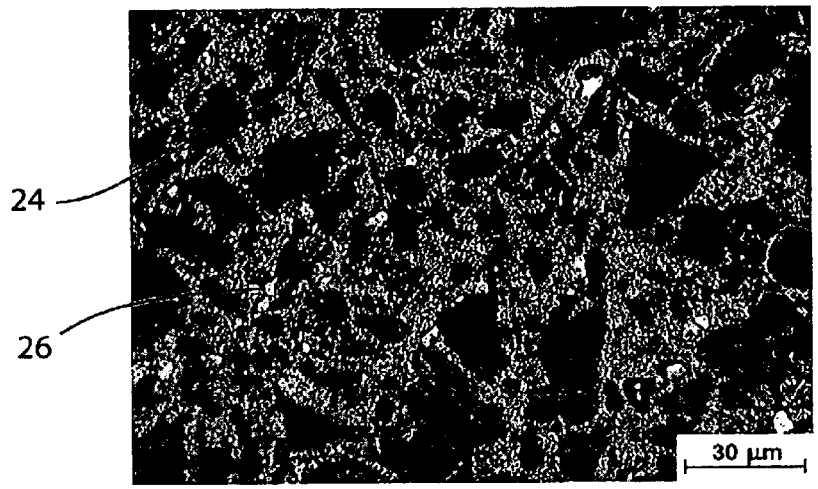
FIGS. 3a–f are SEM photomicrographs of cross sections of the particles of FIGS. 1a–f at a higher resolution than FIGS. 2a–f.
Figure 3B:
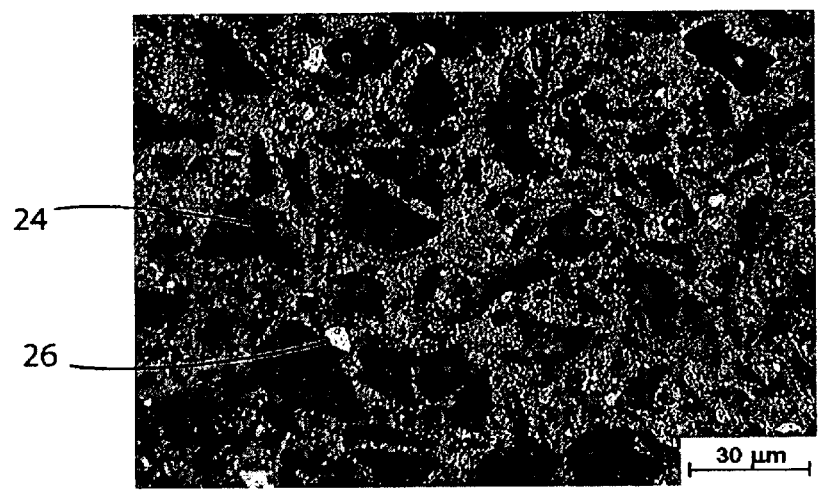
Figure 3C:
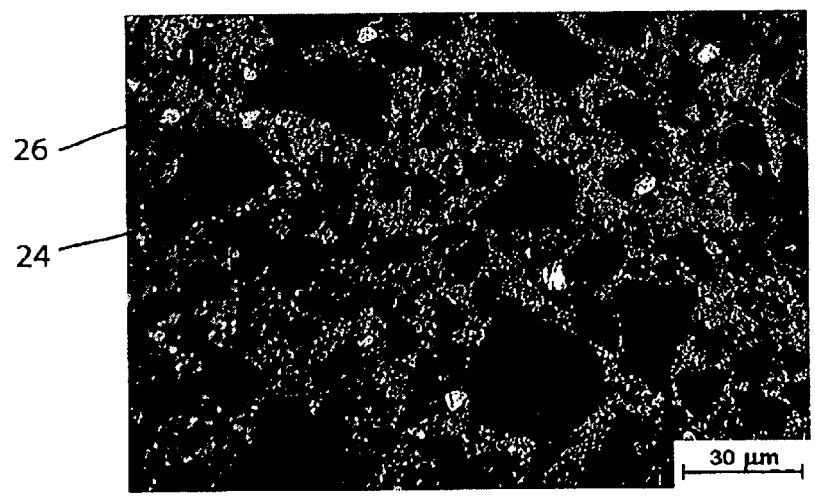
Figure 3D:
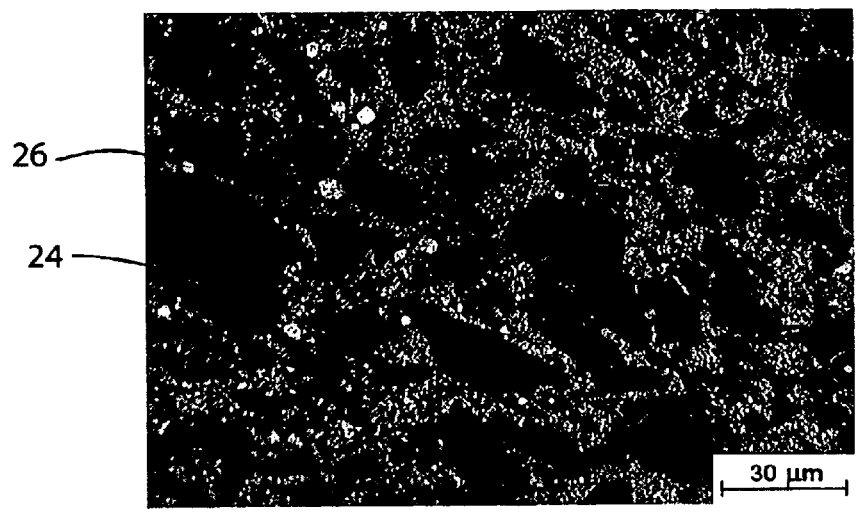
Figure 3E:
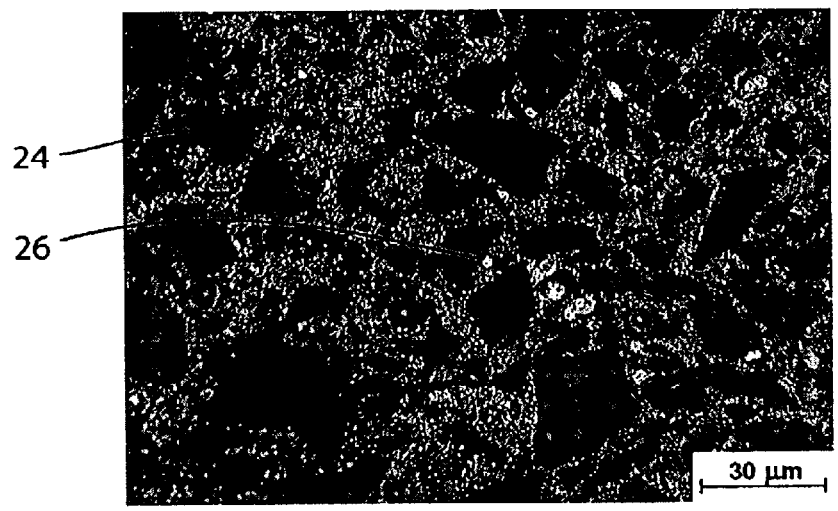
Figure 3F:
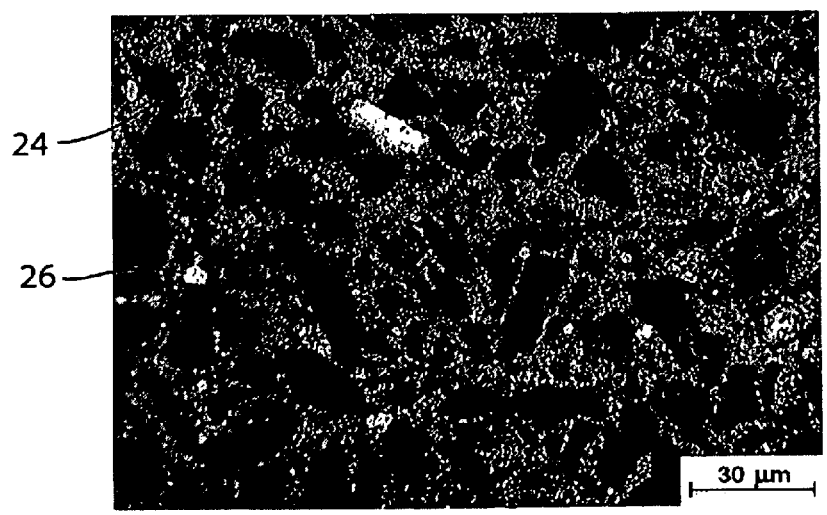
Figure 4A:
FIGS. 4a–f are SEM photomicrographs of cross sections of the particles of FIGS. 1a–f at a higher resolution than FIGS. 3a–f.
Figure 4B:
Figure 4C:
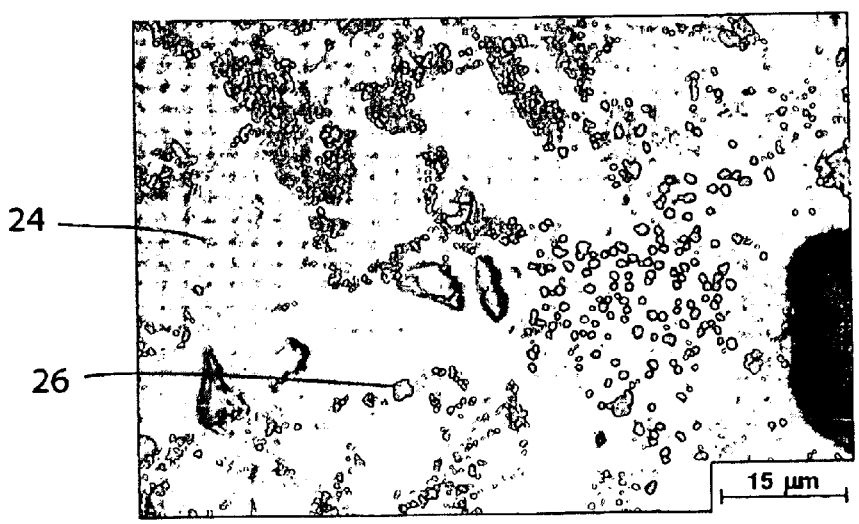
Figure 4D:
Figure 4E:
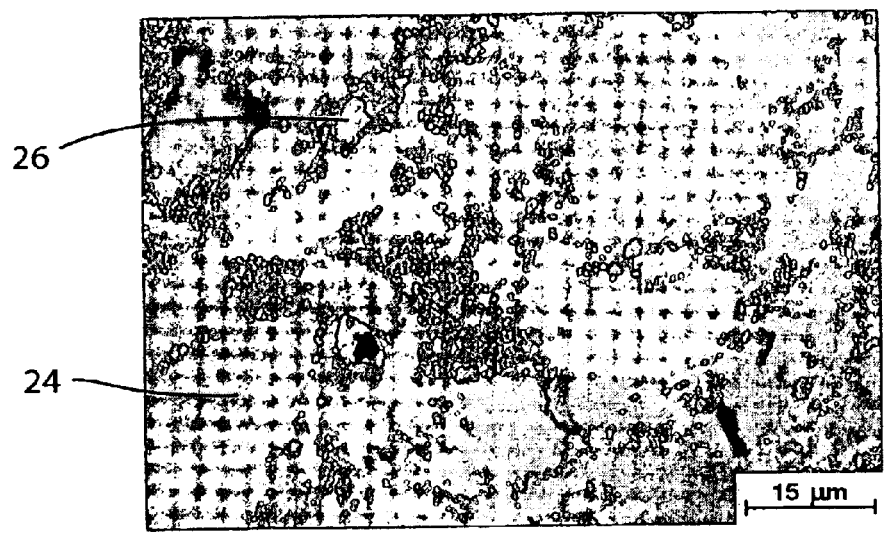
Figure 4F:
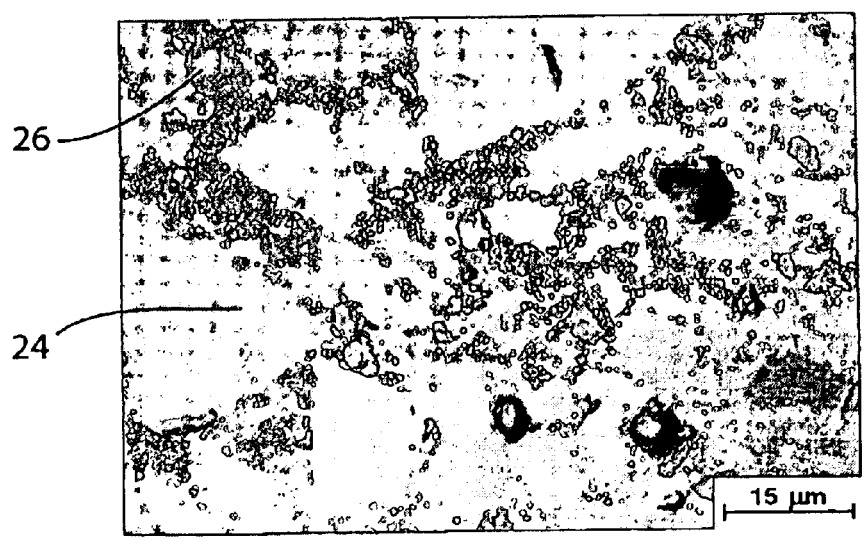
Figure 5A:
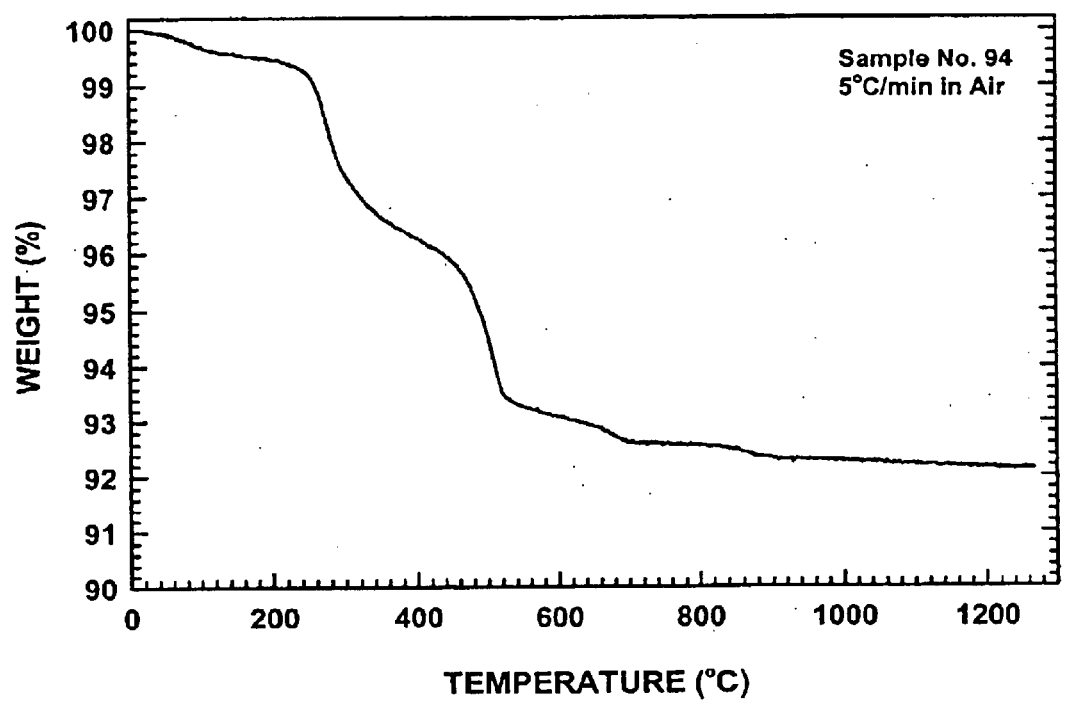
FIGS. 5a–e are graphical representations of the results of a thermal gravimetric analysis of samples of the proppant composition of the present invention.
Figure 5B:
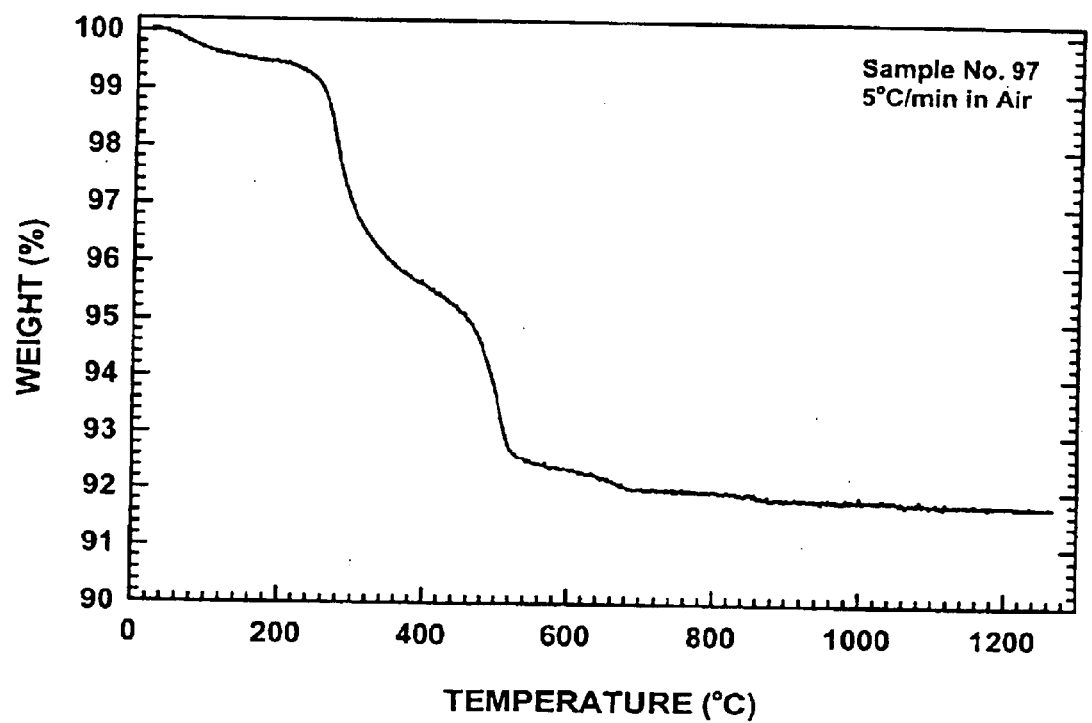
Figure 5C:
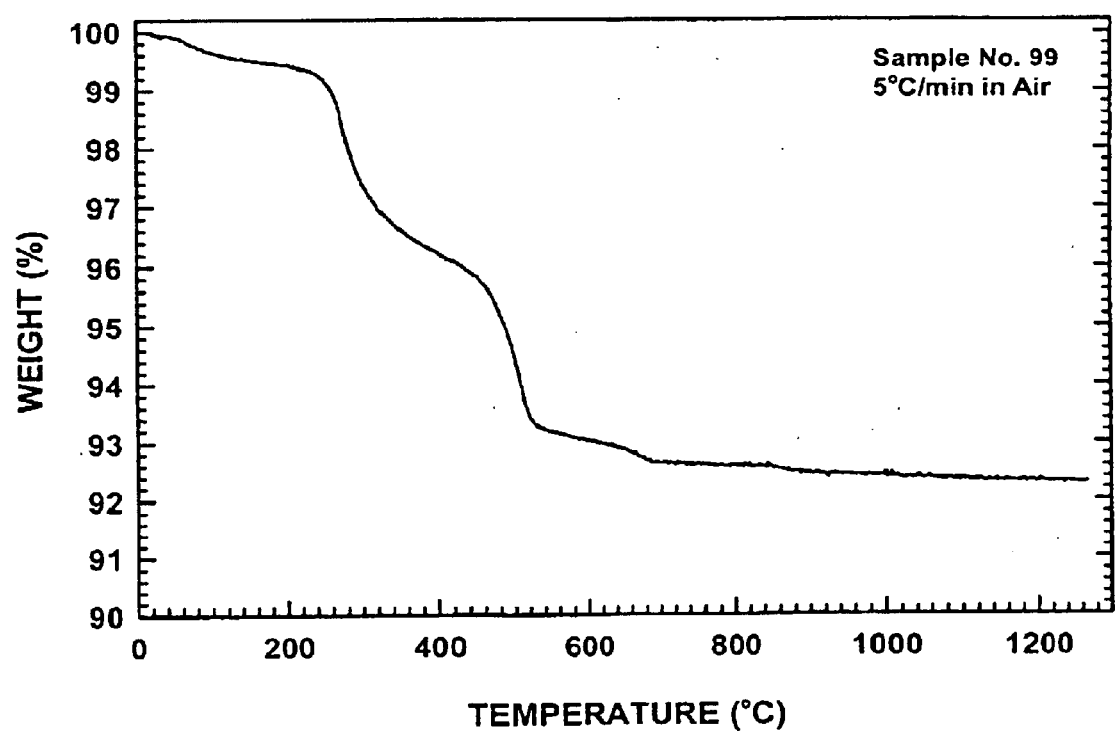
Figure 5D:
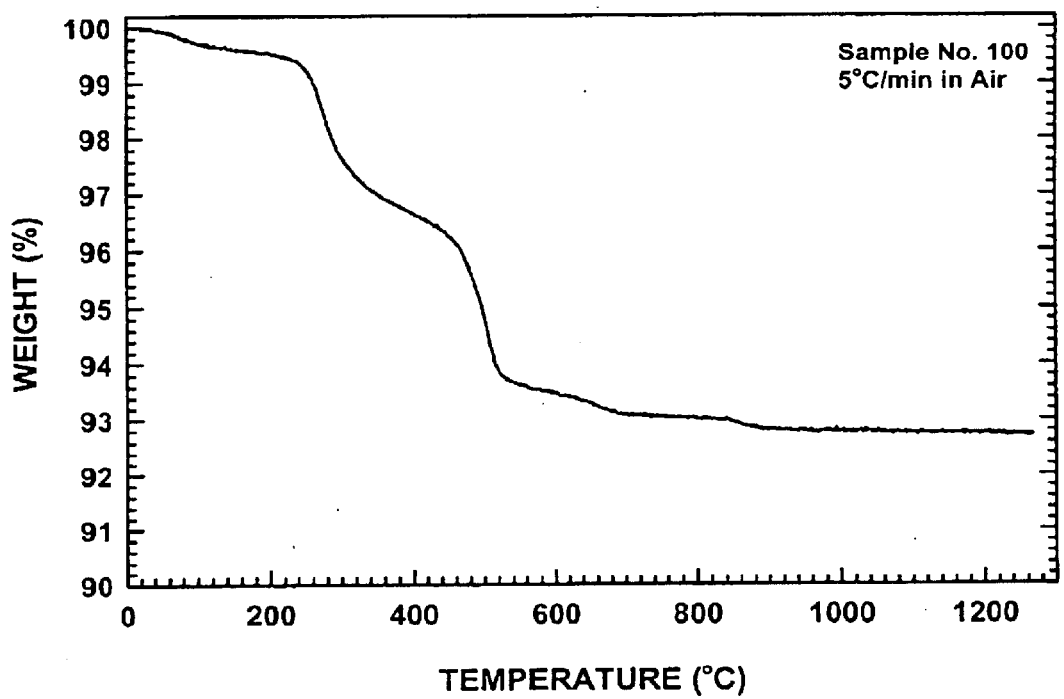
Figure 5E:
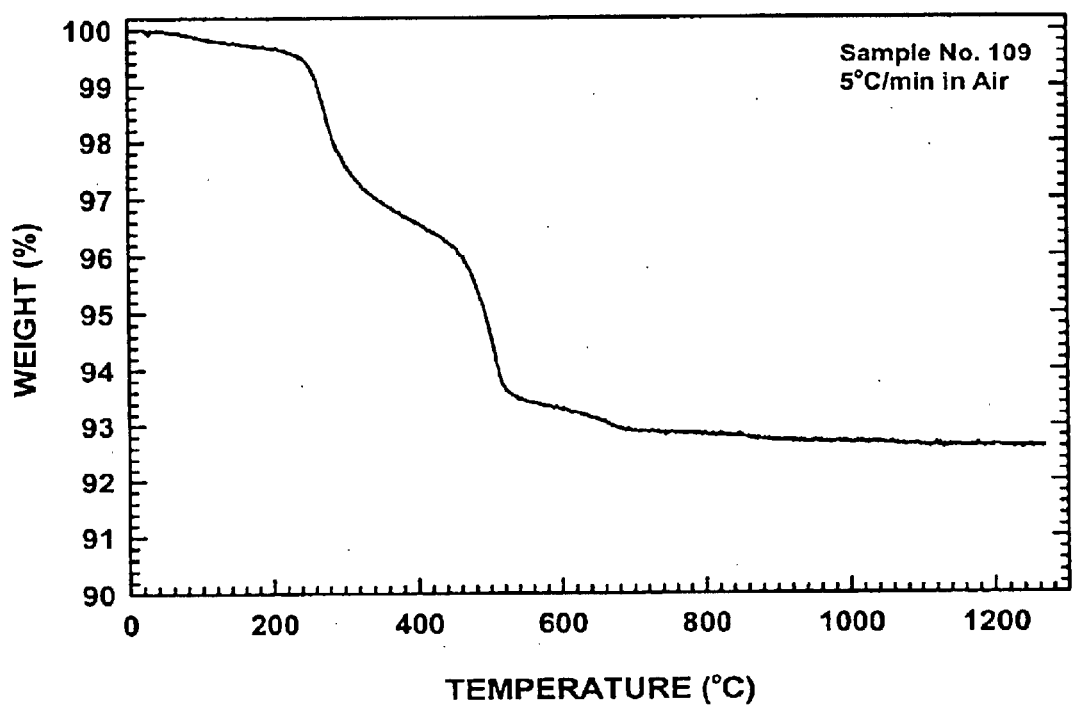
Figure 6A:
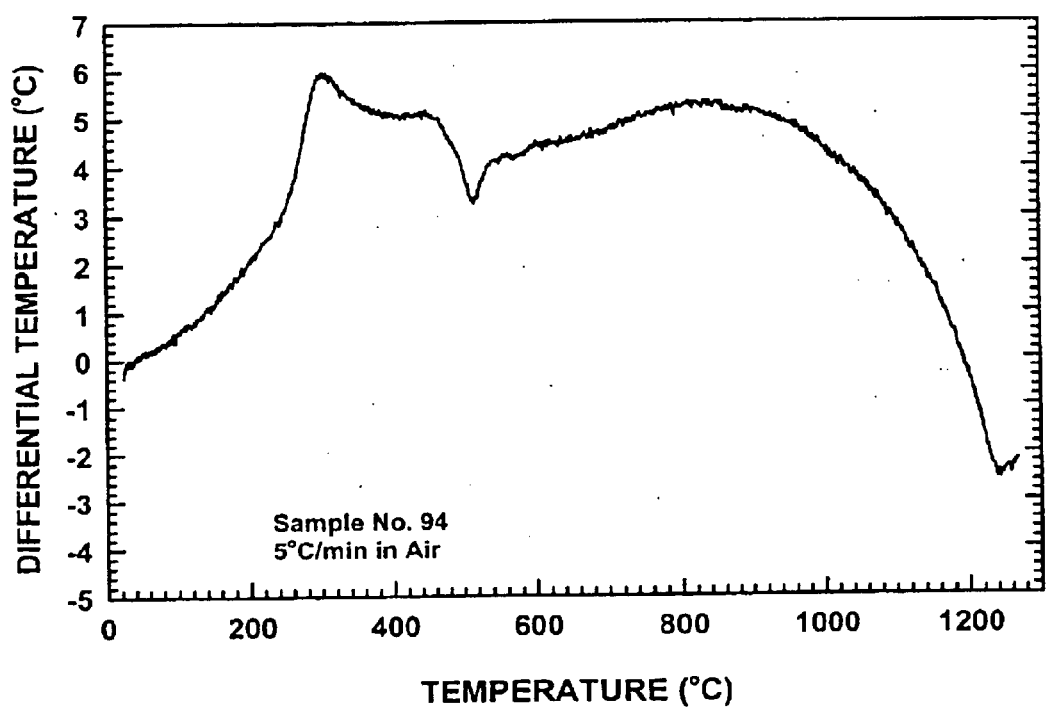

The present invention is a low density, high strength proppant composition for use in hydraulic fracturing of subterranean formation surrounding oil wells, gas wells and similar bore holes. In accordance with the present invention, the composition is formed of solid, spherical particles having a corundum or alumina ($Al_2O_3$) content of between 10 and 25% by weight and a silica ($SiO_2$) content of between 45 to 70% by weight, with other mineral ingredients optionally being present. These other ingredients may include hematite ($Fe_2O_3$), ringwoodite (($Mg,Fe)_2SiO_4$) and/or anorthite ($CaO.AL_2O_3.2SiO_2$) in amounts of between 5 to 40% by weight of the composition. The alumina and silica are held together by a binder comprising wollastonite and talc added during the formation of the particles. This binder enables the above composition to be used in wells having pressures of up to 10,000 psi and preferably between 5,000 psi to 10,000 psi.

For purposes of the present invention, the proppant pellets should have a composition with an alumina content of between 10 and 25% by weight, preferably between 15 and 25% by weight, and a silica ($SiO_2$) content of between 45 and 70% by weight, preferably between 50 to 65% by weight. In a particularly preferred embodiment, the composition of the proppant particles is formed of bauxite attained from Silver & Baryte, Inc., Greece shale obtained from a mine located in Taylor, Wis., and sand or quartz having a purity of greater than 99 percent, obtained from Badger Mining Corporation. To these three main ingredients is added a binder comprised of wollastonite and talc in an amount of 10% or less by weight of the total composition. For each component of the binder, the percent added to the proppant composition is between about 1% and about 10% weight, and preferably between about 2% and 5% by weight.

A number of batches of proppant pellets formed of these preferred materials had the following composition.

TABLE I

| | | Components All in Weight Percent | | | | |
|---|---|---|---|---|---|---|
| Mix number | # of Batches | Uncalcined Bauxite | Quartz | Taylor Shale | Wollastonite | Talc |
| 94 | 7 | 30 | 30 | 30 | 5 | 5 |
| 97 | 33 | 31.67 | 31.67 | 31.67 | 2.5 | 2.5 |
| 99 | 8 | 30.83 | 30.83 | 30.83 | 5 | 2.5 |
| 100 | 6 | 30.83 | 30.83 | 30.83 | 2.5 | 5 |
| 109 | 2 | 32 | 32 | 32 | 2 | 2 |

To form the proppant pellets having the above-described composition, initially the materials are sized by grinding to ensure that the components are formed entirely of particles of the proper size. Any conventional technique can be employed to reduce the particle size of the ceramic ingredients to the desired small size. For example, each of the material can be ground down using a suitable grinder or mixer in which the raw materials are placed to ensure that each material is formed into particles having the necessary size. Each of the ingredients should have an average particle size of less than about 15 microns and preferably less than about 10 microns and most preferably, less than about 5 microns. Small particle size is required for each component in order to obtain a finished spherical sintered pellet having the desired density and strength.

Each of the main components of the sintered proppant particle composition were also tested to determine the apparent density and surface area of each of the components. The density was determined using helium gas pycnometry while the specific surface area for two samples of each ingredient was determined by outgassing the samples at a specific temperature for a specified period of time.

The bauxite was outgassed at a temperature of 250° C. for greater than 4 hours, the quartz was outgassed at 250° C. for greater than 3 hours, and the shale was outgassed at a temperature of 150° C. for greater than 3 hours. The results of the density and surface area testing as shown as follows in Table II.

TABLE II

| Ingredient | Gas Pycnometry Density (g/cm³) | Surface Area (m²/g) |
|---|---|---|
| Uncalcined Bauxite Drum #23: | 3.19 (±0.03) | 19.7 |
|  |  | 19.4 |
| Uncalcined Bauxite Drum #25: | 3.27 (±0.04) | 17.1 |
|  |  | 16.0 |
| Quartz: | 2.64 (±0.01) | 1.0 |
|  |  | 0.65 |
| Uncalcined Taylor Shale: | 2.64 (±0.02) | 0.6 |
|  |  | 10.4 |

Each of the materials used in the present invention is then usually air dried at low temperature, e.g. 90°–150° C. (200°–300° F.) prior to use in forming the mixture. Air drying removes free moisture; that is, moisture that is not chemically combined with the materials. If some calcined ingredients are used, these ingredients are initially calcined by known prior art methods, at temperatures and times sufficiently high, typically 1000°–1200° C., to remove any organic material and to remove most or all water of hydration, which is water chemically combined with the material. The calcined and partially calcined materials may be used without further treatment unless they have been stored in a manner that permits pickup of free moisture, in which circumstance they should be dried in air or at low temperature prior to use, similarly to the uncalcined ingredients. Excess free moisture may cause agglomeration and caking during milling of the ingredients.

In one preferred method of forming the proppant, the sintered pellets of the present invention are made as follows:

Starting ingredients of uncalcined, partially calcined or calcined bauxite, shale and quartz are added in equal parts by weight to a high intensity mixer. Then, amounts of wollastonite and talc that is less than 10% by weight of the total mixture are added to the bauxite, shale and quartz. However, the order of the addition of the ingredients to the mixture is not essential and can be varied as necessary. The ratio of ingredients is chosen based on analysis of the ingredients and desired analysis and specific gravity of the pellets to be produced.

The powdered ceramic starting ingredients are stirred to form a dry homogeneous particulate mixture. A preferred stirring or mixing device is that obtainable from Eirich Machines, Inc., of Gurnee, Ill., known as the RV02 High Intensity Mixer. A mixer of this type is provided with a horizontal or inclined circular table, which can be made to rotate at a speed of from about 10 to about 60 revolutions per minute (rpm), and is provided with a rotatable impacting impeller, which can be made to rotate at a tip speed of from about 5 to about 50 meters per second. The direction of rotation of the table is opposite that of the impeller, causing material added to the mixer to flow over itself in counter-current manner. The central axis of the impacting impeller is generally located within the mixer at a position off center from the central axis of the rotatable table. The table may be in a horizontal or inclined position, wherein the incline, if any, is between 0 and 35 degrees from the horizontal.

The impacting impeller is preferably a disk provided with peripheral rods or bars attached to the disk. The longitudinal axis of the rods or bars is desirably essentially parallel with the axis of rotation of the impeller, which is usually a vertical axis. The diameter of the impeller is measured from the axis of rotation to the center of the most distant rod or bar. Tip speed is the speed of the most distant rod or bar.

The diameter of the impeller depends upon the size of the mixer but is usually slightly less than 25 percent of the diameter of the mixer. The impeller in most applications is between 10 and 100 centimeters in diameter and usually rotates at from 200 to 3,750 rpm at the lower tip speeds of 10 to 20 meters per second, depending upon impeller diameter, and at from 500 to 6,500 rpm at the higher tip speeds of 25 to 35 meters per second, depending upon impeller diameter.

While the mixture is being stirred, there is added a sufficient amount of water and starch to cause formation of composite, spherical pellets from the ceramic powder mixture.

In general, the total quantity of water which is sufficient to cause essentially spherical pellets to form is from about 2 to about 10 percent by weight of the initial starting ceramic ingredients and usually between about 2 and about 4 percent by weight of the initial ceramic powder. The total mixing time usually is from about 10 to about 15 minutes.

After all of the ingredients of the mixture are added to the mixer, the table is rotated at from about 10 to about 60 rpm and, preferably, from about 20 to about 40 rpm, and the impacting impeller is rotated to obtain a tip speed of from about 25 to about 50, preferably, from about 25 to about 35, meters per second to thoroughly mix the ingredients. Sufficient water and starch is then added to assist the formation of essentially spherical pellets of the desired size. The rate of water addition is not critical because intense mixing action quickly disperses the water throughout the particles. At this point, the impeller is then rotated at a lower tip speed of from about 5 to about 20 meters per second to form the spherical particles or pellets. If desired, the rotation of the impeller may then be stopped while the table continues to rotate for between about 1 and about 5 minutes.

As an alternative to the batch processing of the spherical pellets using the high intensity mixer, it is also possible to provide for a continuous formation of the spherical pellets utilizing a fluidized bed processing system. An example of such a system is disclosed in U.S. Pat. No. 4,440,866, Lunghofer et al., which is incorporated herein by reference.

The fluidized bed system can be utilized in a process to form the spherical pellets that comprises the steps of:

(a) preparing an aqueous feed suspension comprising the components or ingredients of the proppant, (b) continuously atomizing said feed suspension into a layer of already partly dried pellets fluidized in a stream of drying air, (c) continuously recovering pellets from the layer (d) continuously separating the recovered pellets in oversize, undersize and product fractions, making allowance for shrinkage in a subsequent sintering operation, (e) continuously recycling material selected from the group consisting of undersize fractions, relative fine product fractions, ground product fractions and ground oversize fractions, to the layer of fluidized pellets at a site at substantial distance, measured along the flow path of the pellets, from the site where the recovering of pellets takes place, and (f) drying the non-recycled product fractions by heating them at a temperature sufficient to remove almost all of the free moisture on the pellets.

The method involving steps in principle corresponding to the above steps (b)–(e) is called fluidized spray granulation and produces pellets having a perfect spherical shape with sufficient crushing strength due to the homogeneity of the suspension achieved by the process.

All steps of the process may be carried out in a continuous manner, which makes the process effective for large scale proppant manufacture.

The fluidized particle layer introduced from a feed tank into the fluid bed unit is supported by a perforated plate through which flows hot fluidizing gas introduced in the bottom part of the fluid unit by means of a fan.

The velocity of the fluidizing and drying air passing through the layer is preferably 0.9–1.5 m/sec. and the height of the fluidized particle layer will typically be 20–60 cm.

The temperature of the drying and fluidizing air when introduced at the bottom part of the fluidized bed unit will preferably be 250–650° C., more preferably 400°–600° C.

When leaving the fluid bed unit the temperature of the air is preferably below 100° C., more preferably approximately 70° C.

The fluidized bed unit gives a long and uniform residence time for the particles to obtain a desired particle size distribution and the desired spherical shape of the product. This is because the flow of particles in the fluidized layer is plug flow, a flow pattern wherein very little back mixing takes place, which ensures an equal treatment of all particles.

After formation, the pellets move to a sieving unit wherein they are separated into three or more fractions, an oversize fraction, one or more product fractions, which is normally two product fractions, and an undersize fraction.

The oversize and undersize fractions are recycled for use in forming additional pellets. The non-recycled product fraction or fractions are fed to a drying oven wherein residual moisture and organic additives are evaporated and thereafter to a sintering apparatus, wherein the particles are sintered to form high strength spheres suitable as propping agents.

Regardless of how the pellets are formed, the resulting pellets are then dried at a temperature well below sintering temperature until less than 10 percent, preferably less than 3 percent and, most preferably, less than 1 percent free moisture remains in the pellets. Drying is preferably done by placing the pellets in a heated open air environment for approximately 24 hours. Alternatively, drying can be accomplished in a rotary kiln with flowing gas at a temperature of between about 100° C. (212° F.) and less than 300° C. (572° F.). A preferred drying gas temperature is between about 175° (347° F.) and 275° C. (527° F.), and the drying time required is usually between about 30 and about 60 minutes. The pellets themselves are generally at a lower temperature than that of the heated gas used to dry them.

The dried pellets are then furnaced or sintered at a sintering temperature for a period sufficient to enable recovery of sintered, spherical pellets. The specific time and temperature to be employed in sintering the pellets is, of course, dependent on the ingredients and furnace employed. The optimum time and temperature for a given starting composition is determined empirically according to the results of physical testing of the resulting pellets after furnacing.

The sintering step is carried out to sinter the composite pellet at a temperature preferably between about 1,100° C. (2,012° F.) and about 1,200° C. (2,192° F.), more preferably between 1130° C. (2,066° F.) and 1180° C. (2,156° F.) and, most preferably, at about 1,167° C. (2,133° F.). For example, the pellets were placed in a sagger in an electrically heated one cubic foot furnace manufactured by Lamont Scientific and the furnace temperature was elevated to 1,167° C. The furnace was held at temperature at that temperature for thirty (30) minutes to ensure that the furnace had stabilized and the pellets had been elevated to the furnace temperature. After the sintering, the power was disconnected and the furnace was left to cool. Upon cooling, the pellets were removed and tested for strength.

To accomplish the sintering step, it is necessary to heat the dried pellets to the sintering temperature in order to form the ceramic proppant.

Alternatively, it is possible to sinter the mixture pellets using a microwave sintering system. Examples of one type of microwave sintering system are disclosed in U.S. Pat. No. 6,104,015, Jayan et al.; U.S. Pat. No. 6,066,290, Dennis et al.; and U.S. Pat. No. 5,902,510, Babaa et al., which are incorporated herein by reference.

In the above examples, the microwave sintering apparatus utilizes a conveying tube through which pass the pellets to be sintered. The microwave sintering apparatus also incorporates a wave guide which connects to a microwave energy source. The source provides a continuous wave (CW) signal which is delivered through the microwave guide into a microwave cavity through which the tube passes. The cavity has a wall which reflects the microwave energy from the signal and keeps it within the cavity. The apparatus also includes a motor-driven microwave stirring device that rotates to scatter the CW signal to create a continuous change in the microwave pattern. This helps provide more uniform exposure to the pellets moving through the portion of the tube within the microwave cavity.

Generally, the pellets enter the round tube at one end of the cavity. The tube extends through the cavity and is made of ceramic at least partially or fully transparent to the microwave energy. The hollow tube normally also includes a pair of insulator sleeves disposed around the tube that retain the signal and heat within the cavity.

The microwave cavity is heated to a sintering temperature by the radiation from the signal interacting with the pellets. To speed up the sintering process within the cavity, an electric resistance heater wire or a highly absorbing microwave receptor material can be located adjacent the entrance of the tube to preheat or supplement the microwave heating resulting from irradiation of the unsintered particles.

To cool the microwave apparatus while in operation, a water jacket fits around the microwave cavity. Water is introduced into the jacket at one end and flows through an outlet at the opposite end. The system and apparatus may include an additional cooling jacket spaced from the outlet of the conveyor tube for subsequent post sintering cooling.

The microwave sintering system may also take the form of a microwave fluidized bed reactor as shown in U.S. Pat. No. 6,074,533, Tranquilla, which is incorporated herein by reference. In such a system, the dried pellets are placed within a fluidized bed reactor through an inlet valve and contacts a flow of gas moving upwardly through the reactor to suspend the dried pellets within the reactor. A microwave energy source disposed above the bed is then engaged to irradiate the dried pellets suspended within the reactor in order to increase the temperature of the reactor and the pellets to a sintering temperature. The pellets are maintained at this temperature for a sufficient time to completely sinter the pellets in order to form the proppant. This time is similar to the residence time for the pellets in the conveyor tube microwave apparatus.

Once the pellets are completely sintered, the microwave source is disengaged and the flow of gas through the reactor is increased so that the sintered pellets can be discharged through an outlet valve on the reactor spaced from the inlet valve.

The pellets are screened for size, preferably after sintering. However, they may be also screened after drying. The rejected oversized and undersized pellets and powdered material obtained after the drying and screening steps may then be recycled to the appropriate step in the process. The overall particle size of the finished pellets used as a propping agent for increasing permeability in a subterranean formation penetrated by a well is between 0.1 and about 2.5 millimeters and preferably between about 0.15 and 1.7 millimeters. This is shown in Table III for a sample of the particles made with Mix 97 of Table I.

TABLE III

|  | 16/20X | 20/40X |
| --- | --- | --- |
| Median diameter | 1.012 mm | 0.691 mm |

The test procedures and apparatus employed to test the conductivity and permeability in darcies of the pellets made with Mix 97 of the present invention, as shown in Table III, included placing a predetermined quantity of the material to be tested between two parallel hardened steel plates, applying force tending to close the initially established 0.125 inch gap between the plates, then measuring the flow rate through the packed cell using distilled water at room temperature at various applied stresses or pressures. The particle size distribution of the pellets was −16 mesh +20 mesh (U.S. Standard Sieve) for the results shown in Table IV, and −20 mesh, +40 mesh (U.S. Standard Sieve) for the results shown in Table V. The Conductivity shown in Table IV and Table V was measured by Stim Laboratory, Houston, Tex. in accordance with The American Petroleum Institute (API) Recommended Procedures for Evaluating Short-Term Proppant Pack Conductivity (PR-61) using 2% KCl as the liquid.

TABLE IV

Conductivity and Permeability of 2.0 lb/sq ft Submitted Sample 16/20X

| Hours at Closure and Temperature | Closure (psi) | Temp (° F.) | Conductivity (md-ft) | Width (in) | Permeability (Darcy) |
| --- | --- | --- | --- | --- | --- |
| −20 | 1000 | 75 | 24062 | 0.245 | 1179 |
| −6 | 1000 | 250 | 21621 | 0.243 | 1068 |
| 0 | 2000 | 250 | 19943 | 0.240 | 997 |
| 10 | 2000 | 250 | 19428 | 0.239 | 976 |
| 20 | 2000 | 250 | 19219 | 0.238 | 969 |
| 30 | 2000 | 250 | 19147 | 0.238 | 965 |
| 40 | 2000 | 250 | 19116 | 0.238 | 964 |
| 50 | 2000 | 250 | 19072 | 0.238 | 962 |
| 0 | 4000 | 250 | 14067 | 0.231 | 731 |
| 10 | 4000 | 250 | 13855 | 0.230 | 723 |
| 20 | 4000 | 250 | 13741 | 0.229 | 720 |
| 30 | 4000 | 250 | 13681 | 0.229 | 717 |
| 40 | 4000 | 250 | 13649 | 0.229 | 715 |
| 50 | 4000 | 250 | 13612 | 0.229 | 713 |
| 0 | 6000 | 250 | 9392 | 0.223 | 505 |
| 10 | 6000 | 250 | 8795 | 0.222 | 475 |
| 20 | 6000 | 250 | 8547 | 0.221 | 464 |
| 30 | 6000 | 250 | 8411 | 0.220 | 459 |
| 40 | 6000 | 250 | 8362 | 0.220 | 456 |
| 50 | 6000 | 250 | 8329 | 0.220 | 454 |
| 0 | 8000 | 250 | 5074 | 0.214 | 285 |
| 10 | 8000 | 250 | 4688 | 0.213 | 264 |
| 20 | 8000 | 250 | 4504 | 0.212 | 255 |
| 30 | 8000 | 250 | 4469 | 0.211 | 254 |
| 40 | 8000 | 250 | 4424 | 0.211 | 252 |
| 50 | 8000 | 250 | 4398 | 0.211 | 250 |
| 0 | 10000 | 250 | 2464 | 0.207 | 143 |
| 10 | 10000 | 250 | 2177 | 0.205 | 127 |
| 20 | 10000 | 250 | 2105 | 0.203 | 124 |
| 30 | 10000 | 250 | 2028 | 0.202 | 121 |
| 40 | 10000 | 250 | 1978 | 0.202 | 118 |
| 50 | 10000 | 250 | 1946 | 0.202 | 116 |

|  | Sieve (US. Mesh) | % Retained |
| --- | --- | --- |
|  | 12 | 0.0 |
|  | 14 | 0.0 |
| Median Dia. = 1.012 mm | 16 | 6.4 |
|  | 18 | 44.8 |
|  | 20 | 48.1 |
|  | 25 | 0.6 |
|  | 30 | 0.1 |
|  | 35 | 0.0 |
|  | 40 | 0.0 |
|  | Pan | 0.0 |
|  | Total | 100.0 |
|  | % in Size | 92.9 |
|  | Median Diameter | 1.012 mm |

TABLE V

Conductivity and Permeability of 2.0 lb/sq ft Submitted Sample 20/40X

| Hours at Closure and Temperature | Closure (psi) | Temp (° F.) | Conductivity (md-ft) | Width (in) | Permeability (Darcy) |
| --- | --- | --- | --- | --- | --- |
| −20 | 1000 | 75 | 9220 | 0.240 | 461 |
| −6 | 1000 | 250 | 8676 | 0.239 | 436 |
| 0 | 2000 | 250 | 8234 | 0.238 | 415 |
| 10 | 2000 | 250 | 8144 | 0.237 | 412 |
| 20 | 2000 | 250 | 8087 | 0.236 | 411 |
| 30 | 2000 | 250 | 8038 | 0.236 | 409 |
| 40 | 2000 | 250 | 7999 | 0.236 | 407 |
| 50 | 2000 | 250 | 7929 | 0.236 | 403 |
| 0 | 4000 | 250 | 6664 | 0.231 | 346 |
| 10 | 4000 | 250 | 6533 | 0.230 | 341 |
| 20 | 4000 | 250 | 6446 | 0.229 | 338 |
| 30 | 4000 | 250 | 6393 | 0.229 | 335 |
| 40 | 4000 | 250 | 6372 | 0.229 | 334 |
| 50 | 4000 | 250 | 6351 | 0.229 | 333 |
| 0 | 6000 | 250 | 5023 | 0.223 | 270 |
| 10 | 6000 | 250 | 4367 | 0.222 | 236 |
| 20 | 6000 | 250 | 4238 | 0.221 | 230 |
| 30 | 6000 | 250 | 4167 | 0.221 | 226 |
| 40 | 6000 | 250 | 4124 | 0.221 | 224 |
| 50 | 6000 | 250 | 4108 | 0.221 | 223 |
| 0 | 8000 | 250 | 2893 | 0.216 | 161 |
| 10 | 8000 | 250 | 2629 | 0.215 | 147 |
| 20 | 8000 | 250 | 2498 | 0.214 | 140 |
| 30 | 8000 | 250 | 2433 | 0.213 | 137 |
| 40 | 8000 | 250 | 2402 | 0.213 | 135 |
| 50 | 8000 | 250 | 2372 | 0.213 | 134 |
| 0 | 10000 | 250 | 1674 | 0.208 | 97 |
| 10 | 10000 | 250 | 1434 | 0.206 | 84 |
| 20 | 10000 | 250 | 1389 | 0.205 | 81 |
| 30 | 10000 | 250 | 1349 | 0.204 | 79 |
| 40 | 10000 | 250 | 1323 | 0.204 | 78 |
| 50 | 10000 | 250 | 1307 | 0.204 | 77 |

|  | Sieve (U.S. Mesh) | % Retained |
| --- | --- | --- |
|  | 16 | 0.0 |
|  | 18 | 0.0 |
| Median Dia. = 0.691 mm | 20 | 6.9 |
|  | 25 | 40.2 |
|  | 30 | 37.6 |

TABLE V-continued

Conductivity and Permeability of 2.0
lb/sq ft Submitted Sample 20/40X

| | | |
|---|---|---|
| | 35 | 13.6 |
| | 40 | 1.7 |
| | 45 | 0.0 |
| | 50 | 0.0 |
| | Pan | 0.0 |
| | Total | 100.0 |
| | % in Size | 93.1 |
| | Median Diameter | 0.691 mm |

Values obtained using the American Petroleum Institute (API) procedure for determining resistance to crushing are reported in Table VI for the −16 mesh, +20 mesh sample and for the −20 mesh, +40 mesh sample. According to this procedure, a bed of about 6 mm depth of sample to be tested is placed in a hollow cylindrical cell. A piston is thereafter inserted in the cell. Thereafter, a load is applied to the sample via the piston. One minute is taken to reach maximum load which is then held for two minutes. The load is thereafter removed, the sample removed from the cell, and screened to separate crushed material. The results are reported as the weight percentage the original sample that crushed. This crushed material is referred to in Table VI as "percent fines generated."

TABLE VI

| Load | 16/20X Percent Fines Generated | 20/40X Percent Fines Generated |
|---|---|---|
| 5000 psi crush | 2.5 | 0.5 |
| 7500 psi crush | 9.8 | 4.3 |
| 10000 psi | 18.7 | 8.3 |

Additional analyses were also conducted on sample particles from each of the batches to determine the exact composition of the particles. Initially, samples of the proppant particles were cut and polished by conventional ceramagraphic methods. These cut and polished samples were placed under a scanning electron microscope (SEM) and had lower magnification micrographs taken to show the porosity of the particles. These micrographs of particles are shown in FIGS. 1a–f and FIGS. 2a–f. Each set of six micrographs illustrates the porosity of the proppant particles and shows the relatively large quartz grains (20) surrounded by a complex intergranular mixture of various phases including pores (22) disposed between the quartz grains (20). The micrographs of FIGS. 1a–f and 2a–f were taken of different areas of each sample taken at magnifications of 125× and 250×, respectively.

Micrographs were also taken at higher magnification of the sample cross-sections to illustrate the phase structure of the proppant particles. These micrographs are illustrated in FIGS. 3a–f and FIGS. 4a–f, which are taken at magnifications of 625× and 1250×, respectively. In these micrographs, the phase structure of the particles is shown illustrating the predominant, dark quartz phase (24) with interspersed larger, white particles of alumina (26).

In each case, the differences between the micrographs of the particles in each batch had no obvious differences in the size and volume fraction of the pores or in the phase structure.

Particles of each batch made were also tested using a thermal gravimetric analysis and a differential thermal analysis. The results of these analyses are graphically illustrated in FIGS. 5a–e and 6a–e, respectively.

To undergo the thermogravimetric analysis and differential thermal analysis, spherical green bodies from each of the batches were lightly crushed into a powder using a mortar and pestle. The samples were heated at an increase of 5° C. per minute in air to a furnace controlled thermocouple temperature of 1,300° C. The sample particles of each batch that were tested exhibited very similar gravimetric analysis and differential thermal analysis behavior.

Referring now to the graphs in FIGS. 5a–e and FIGS. 6a–e, the graphs illustrate that the sample particles from each batch gradually loose weight during the temperature range of 25 to 225° C. The weight loss in this range varies between 0.4–0.7% by weight with an average of 0.6% weight. This weight loss is most likely due to moisture loss and may also be due to a loss of the most volatile portion of the organic binder.

In the temperature range of approximately 225–450° C., a much greater amount of weight loss occurs. The weight losses for these particles tested was in the range of approximately 2.7–3.7% by weight with the average loss being 3.2% by weight. This average is close to the amount of binder incorporated in the batches from which the particles were formed, i.e. 3.19% by weight. The differential thermal analysis data shown in FIGS. 6a–e also shows an exothermic peak in this temperature range that is consistent with the weight loss in this range being associated with binder burnout, as the oxidative degradation of organic polymers is an exothermic process. The temperature range shown in FIGS. 6a–e for the maximum height of the exothermic peak varies between 301–307° C.

A third region of rapid weight loss occurs from approximately 450–525° C. that is immediately followed by a slower region of weight loss from approximately 525–700° C. As specifically shown in the differential thermal analysis data in FIGS. 6a–e, a relatively large endothermic peak is observed during this stage which varied in a range of 511–515° C. for each of the samples. The endothermic peak shown in FIGS. 6a–e and the weight loss shown in FIGS. 5a–e are attributed to the decomposition or dehydroxylation of the aluminum monohydroxide compounds in the bauxite.

A very small endothermic peak was also observed in all the samples at a higher temperature. The temperature for the maximum absolute value of the endotherm peak varied in the narrow range of 569–578° C. for the five samples. It is most easily observed in the plots for sample Nos. 99, 100 and 109 and it is barely detected in the plots for sample Nos. 94 and 97. An X-ray diffraction analysis would be required to determine definitively the cause of this endothermic peak. However, there are several possibilities for the cause of this peak: First, the endotherm may be due to the displacive α⇔β phase transformation that occurs in quartz. This explanation seems most likely because the temperature of the endotherm is in very close agreement with the reported temperature (573° C.) for the α⇒β quartz phase transformation. Second, the endotherm may be associated with other dehydroxylation reactions, such as from the talc additive or from impurity phases (e.g., clays) in the raw materials. Third, there may also be other decomposition reactions associated with impurity phases. For example, carbonate decomposition would occur if calcite ($CaCO_3$) was present as an impurity. Calcite is a possible impurity phase in the bauxite raw material. However, in this case, calcite decomposition seems an unlikely explanation for the second endothermic peak because the expected decomposition temperature would be higher than 570° C.

The weight loss from 450–700° C. was in the range of 3.3–3.7% by weight for each of the samples with an average weight loss of 3.6% by weight. This average value is close to the weight loss expected from the dehydroxylation of the bauxite. Furthermore, each of the samples was prepared with batch compositions in which the bauxite contents were in the range of 30–32% by weight with the loss on ignition values reported for the bauxite samples being in the range of approximately 11.8–11.9% by weight. As a result, the expected weight loss contribution from the bauxite alone in each sample should be between approximately 3.5–3.8% by weight, which is very close to the observed weight loss in this temperature region.

Finally, each of the samples exhibited a small gradual weight loss above 700° C. The weight losses for this temperature range in each of the 5 samples were between 0.3–0.5% by weight with an average value of 0.4% by weight. This weight loss is associated with the removal of residual hydroxyl groups for the most part.

Sample particles from each batch were also analyzed using an X-ray diffraction analysis. The sintered sphere samples were crushed into a powder using an alumina mortar and pestle and an X-ray diffraction (XRD) analysis was carried out on the powdered samples. The initial samples were mixed with a 10–20% addition of high-purity fluorite ($CaF_2$) powder which was used as an internal standard for the XRD analysis. Initially, the samples were scanned from 0–90 degrees (2θ) at a rate of 3 degrees per minute. These plots for each batch are shown in FIGS. 7–11b. The plots are illustrated as an overall plot and two magnified halves of the overall plot from 10–50 and 50–90 degrees, respectively. Subsequently, the samples were run without the fluorite over the range of 20–45 degrees (2θ) at a rate of 0.6 degrees per minute. These plots for each batch are shown in FIGS. 12–16.

Figure 7:
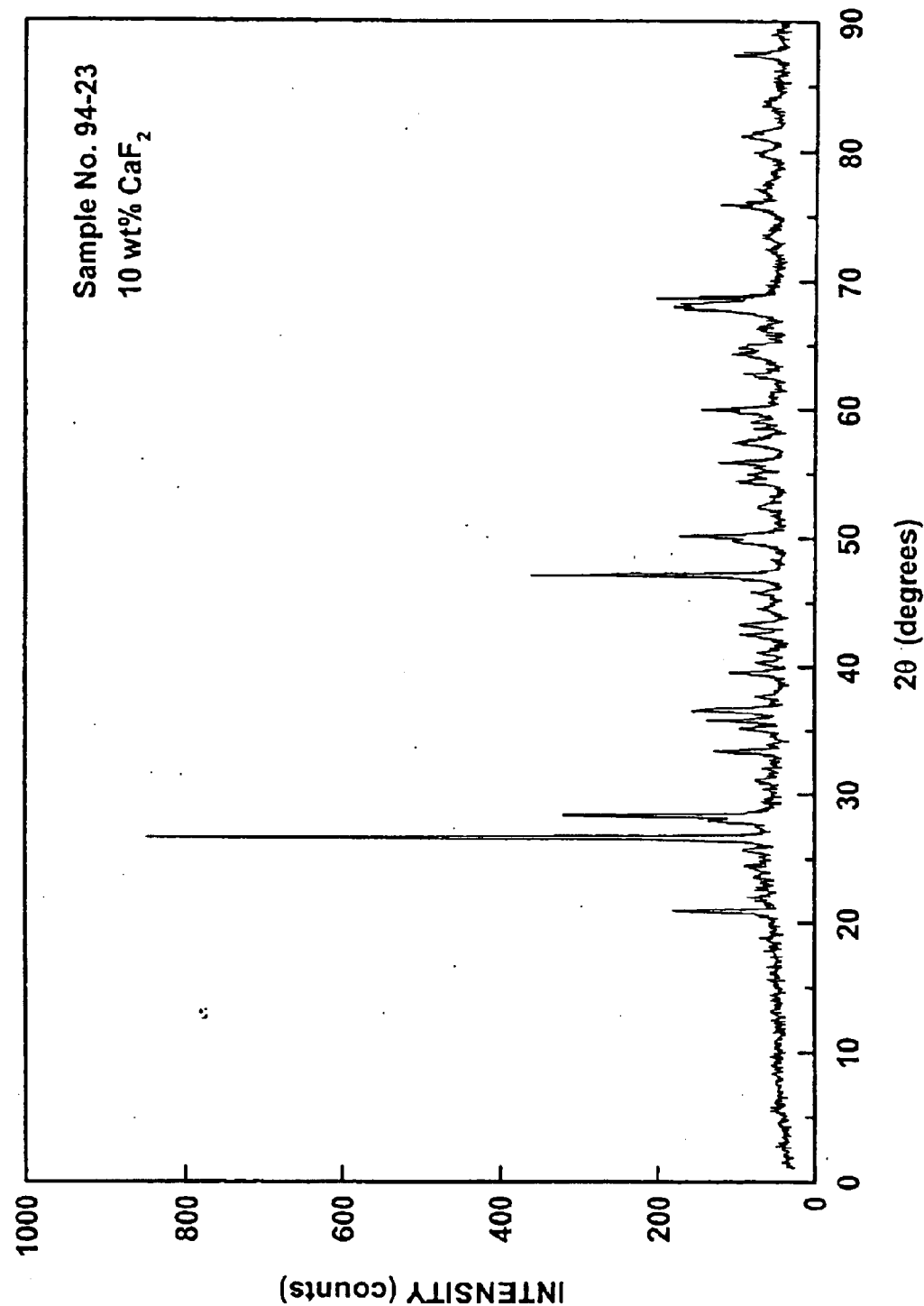
FIGS. 7–7b are X-ray diffraction plots of a first sample of the proppant composition obtained during a first measurement.
Figure 7B:
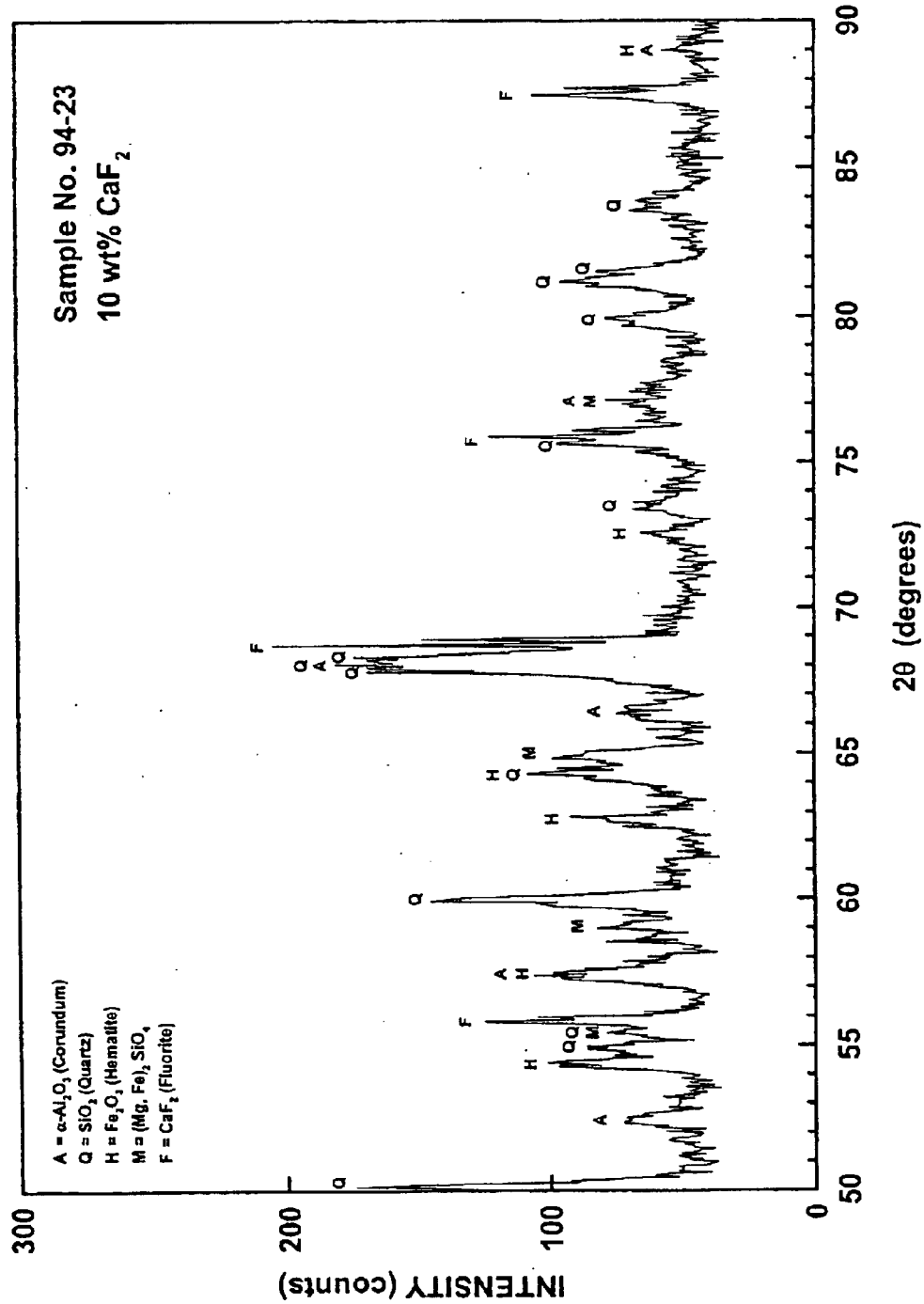
Figure 12:
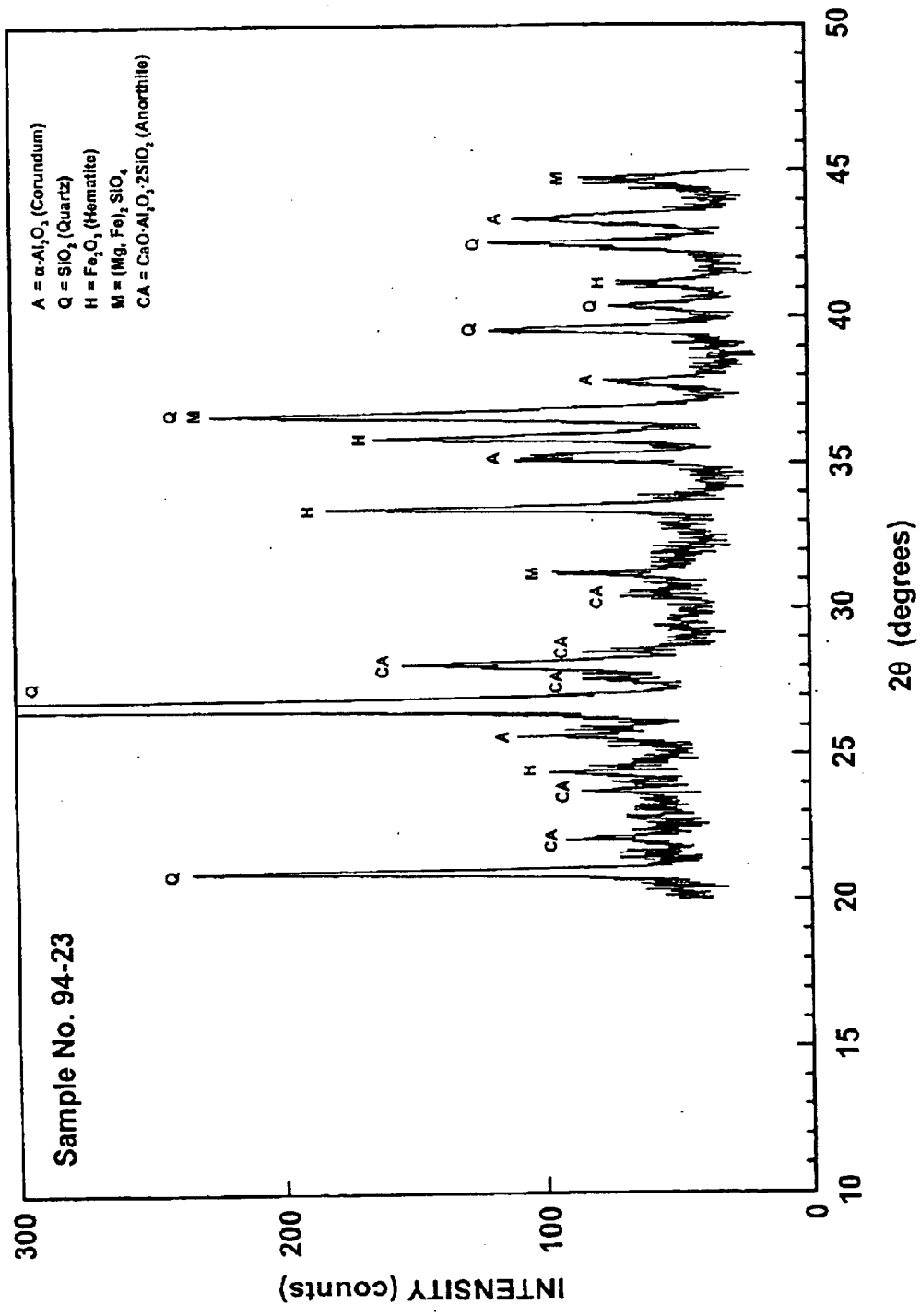
FIG. 12 is an X-ray diffraction plot of a first sample of the proppant composition obtained during a second measurement.

Sample No. 94 was prepared with 5% by weight each of talc and wollastonite. As shown in FIGS. 7–7b and 12, the major phase in sample No. 94 is quartz, which is expected since 60% of the starting material was quartz and shale. Alpha alumina (α-$Al_2O_3$) and hematite ($Fe_2O_3$) are secondary phases. This is expected since the starting material was 30% of a high-iron content bauxite. The XRD pattern of the "Greek bauxite" provided by EPL shows that the starting material consisted primarily of diaspore, but that boehmite and hematite were also present in significant quantities. The diaspore and boehmite are aluminum monohydroxides which decompose (dehydroxylate) upon heat treatment to form aluminum oxide ($Al_2O_3$). At sufficiently high temperatures, the stable phase of alumina (i.e., the alpha phase, corundum) will form. The firing temperature for all the samples in this study was sufficiently high to form α-$Al_2O_3$. The XRD results for Sample No. 94 show that much of the hematite present in the starting raw material is retained upon heat treatment.

Sample No. 94 also contained a small amount of a magnesium iron silicate phase, $(Mg,Fe)_2SiO_4$ (ringwoodite), with a spinel crystal structure. The formation of this phase arises because of the addition of 5 wt % talc ($Mg_3(Si_2O_5)_2(OH)_2$) in the starting composition.

Sample No. 94 also contained another minor phase which is believed to be anorthite. Identification of this phase was obscured in the 0–90 degree XRD scan by the $CaF_2$ internal standard. However, the additional peaks were clearly observed in the 20–45 degree XRD scan in which the $CaF_2$ standard was left out and the scan rate was slower. We found phases from four JCPDS files which have expected d-spacings in close agreement with the observed peaks.

These phases were all from the feldspar group: anorthite, a calcium aluminum silicate with composition of $CaAl_2SiO_8$; albite, a sodium calcium aluminum silicate with composition $NaAlSi_3O_8$; and albite/calcian, a sodium calcium aluminum silicate with composition $(Na,Ca)(Si,Al)_4O_8$. It has been concluded that the phase is anorthite for two reasons. First, chemical analysis shows that the samples have a very low sodium content. Second, the peaks associated with this phase are much stronger in the two samples which contained the largest wollastonite ($CaSiO_3$) additions (i.e., Sample Nos. 94 and 99). Therefore, the phase with the highest calcium content (i.e., anorthite) is the most likely choice.

Figure 8B:
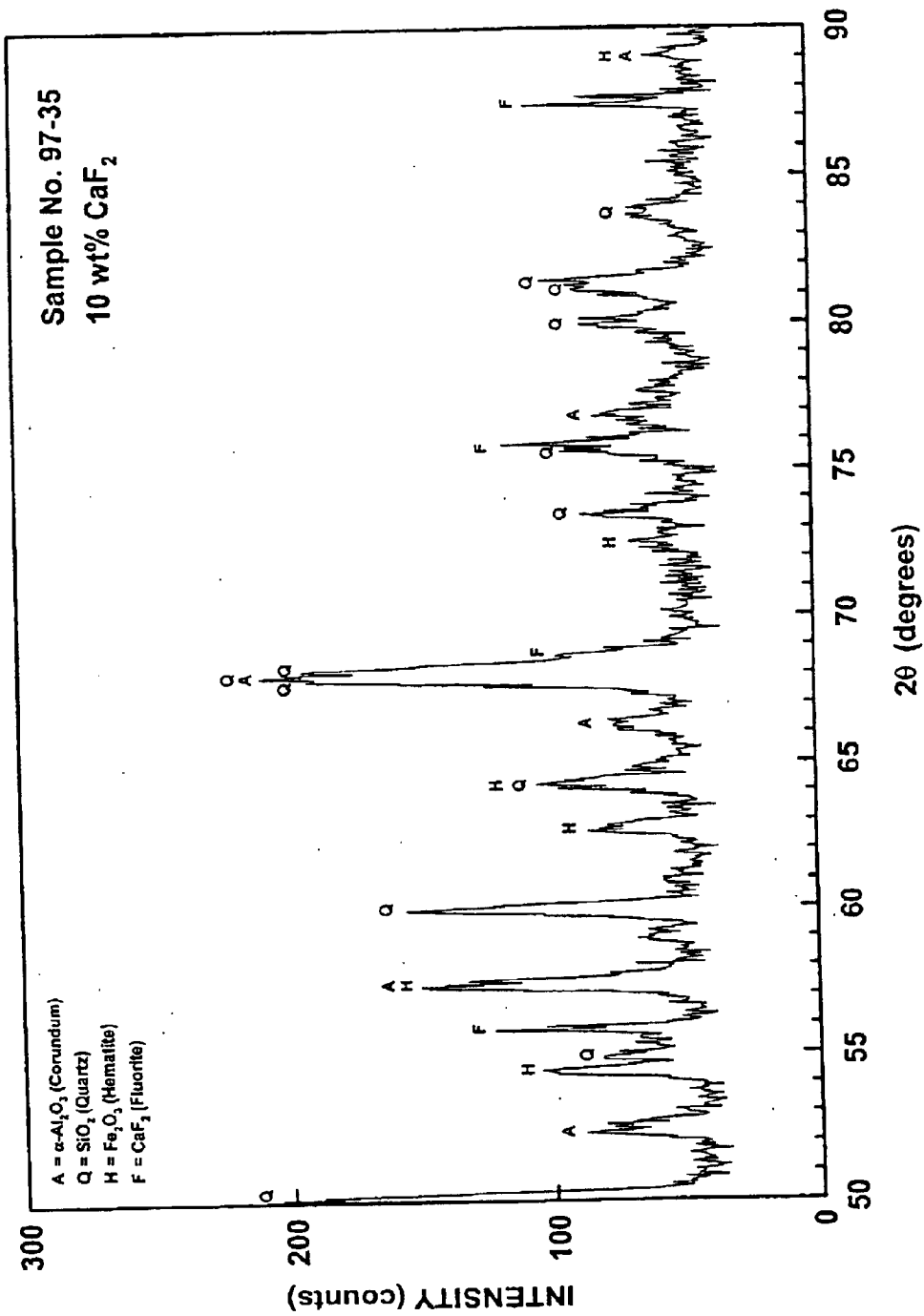
Figure 13:
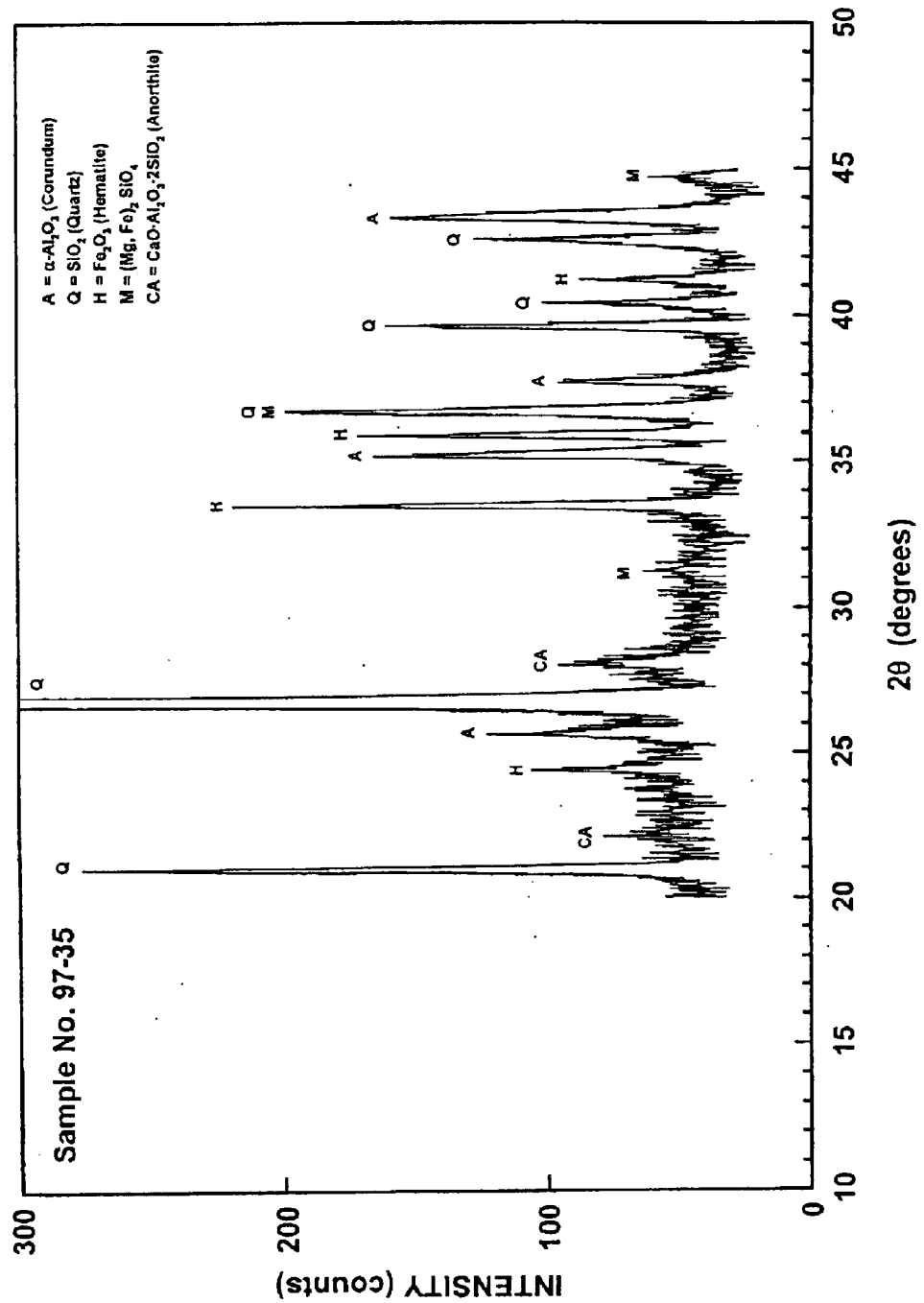
FIG. 13 is an X-ray diffraction plot of a second sample of the proppant composition obtained during a second measurement.

Sample No. 97 was prepared with 2.5 wt % each of talc and wollastonite. The XRD pattern for this sample is shown in FIGS. 8–8b and 13, and is similar to the pattern observed for Sample No. 94 in that quartz is the major phase and α-$Al_2O_3$ and hemastite ($Fe_2O_3$) are secondary phases.

A very small amount of the magnesium iron silicate spinel phase $(Mg,Fe)_2SiO_4$ is observed, but only in the XRD pattern run from 20–45° 2θ at the slower scan rate. In addition, a very small amount of the feldspar phase ($CaAl_2SiO_8$, anorthite) is observed in this pattern. The smaller amounts of these two phases compared that observed in the pattern for Sample No. 94 is consistent with the lower talc and wollastonite amounts in the starting material.

Figure 9A:
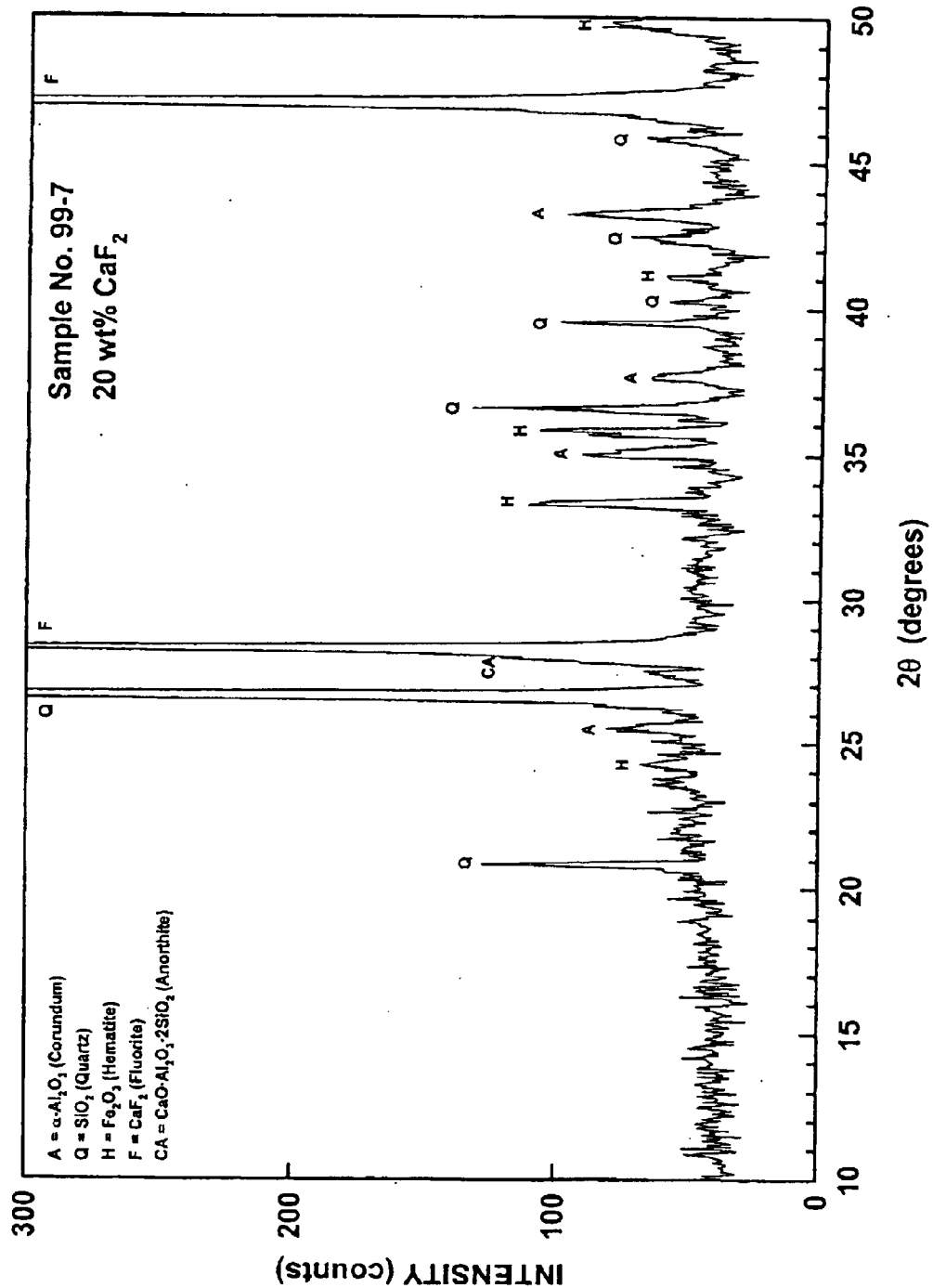
FIGS. 9–9b are X-ray diffraction plots of a third sample of the proppant composition obtained during a first measurement.
Figure 14:
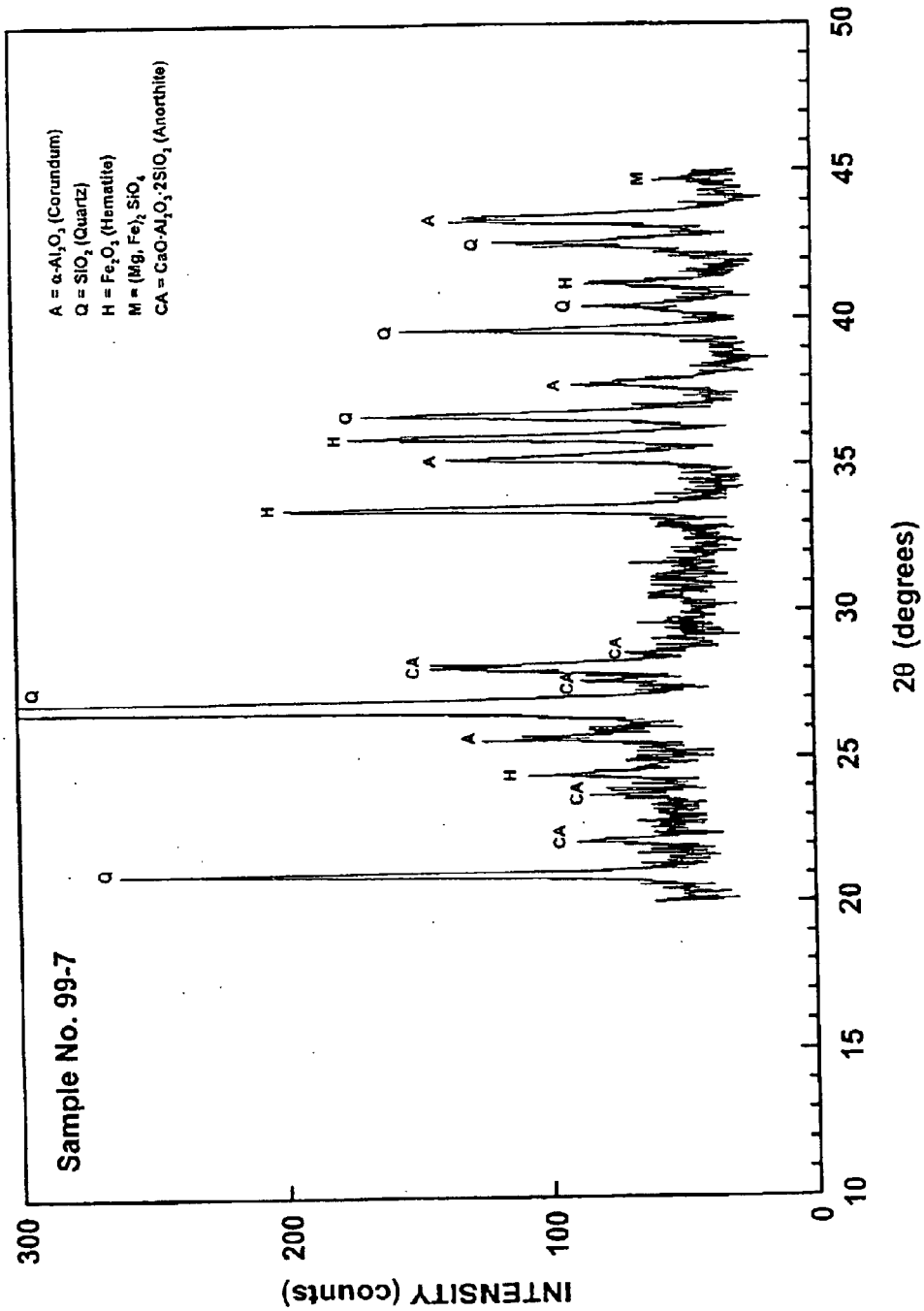
FIG. 14 is an X-ray diffraction plot of a third sample of the proppant composition obtained during a second measurement.

Sample No. 99 was prepared with 2.5 wt % of talc and 5 wt % of wollastonite. The XRD pattern for this sample is shown in FIGS. 9–9b and 14, and is similar to the pattern observed for Sample Nos. 94 and 97 in that quartz is the major phase and α-$Al_2O_3$ and hematite ($Fe_2O_3$) are secondary phases.

A very small amount of the magnesium iron silicate spinel phase $(Mg,Fe)_2SiO_4$ is observed, but only in the XRD pattern run from 20–45 degrees 2θ at the slower scan rate. The intensity of the (only) peak observed for this phase is comparable to that observed in Sample No. 97 and considerably lower than that observed in Sample No. 94. This is consistent with the talc contents used in each of these samples.

A larger amount of the feldspar phase ($CaAl_2SiO_8$, anorthite) is observed in the XRD pattern run from 20–45 degrees 2θ at the slower scan rate. The intensities of the peaks for this phase are similar to those observed in Sample No. 94. This is consistent with the higher wollastonite content (5 wt %) used in these samples.

Figure 10A:
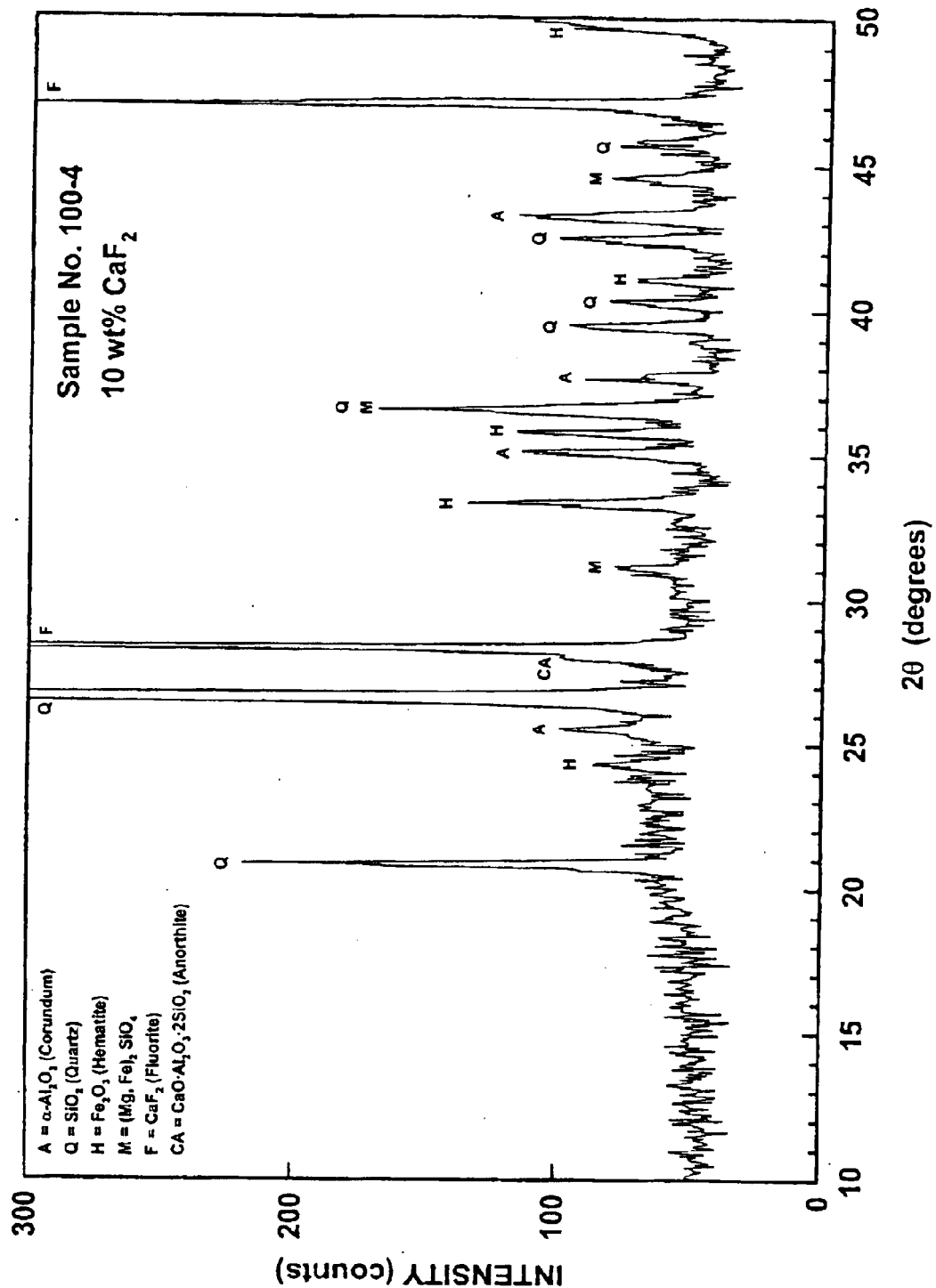
FIGS. 10–10b are X-ray diffraction plots of a fourth sample of the proppant composition obtained during a first measurement.
Figure 10B:
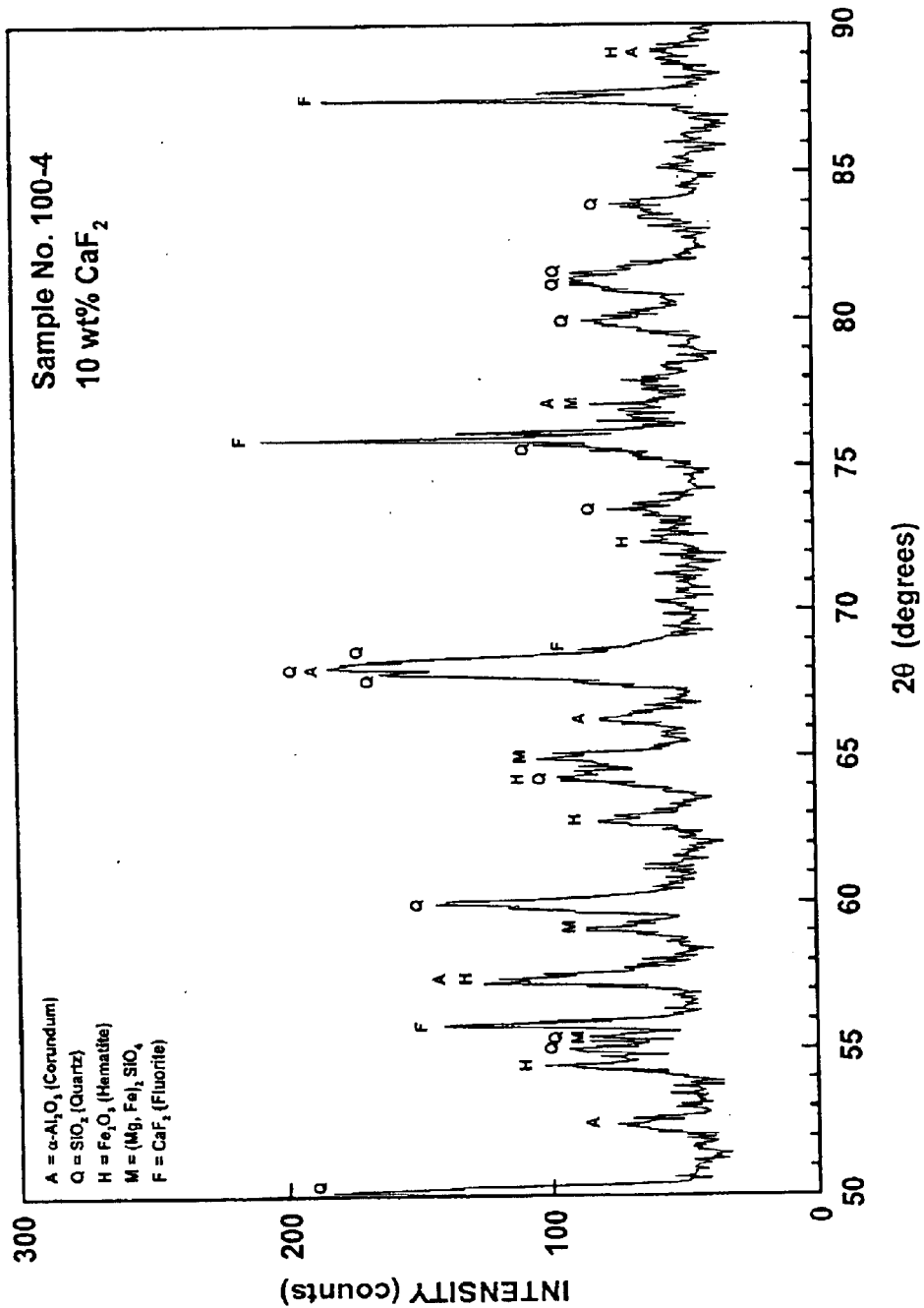
Figure 15:
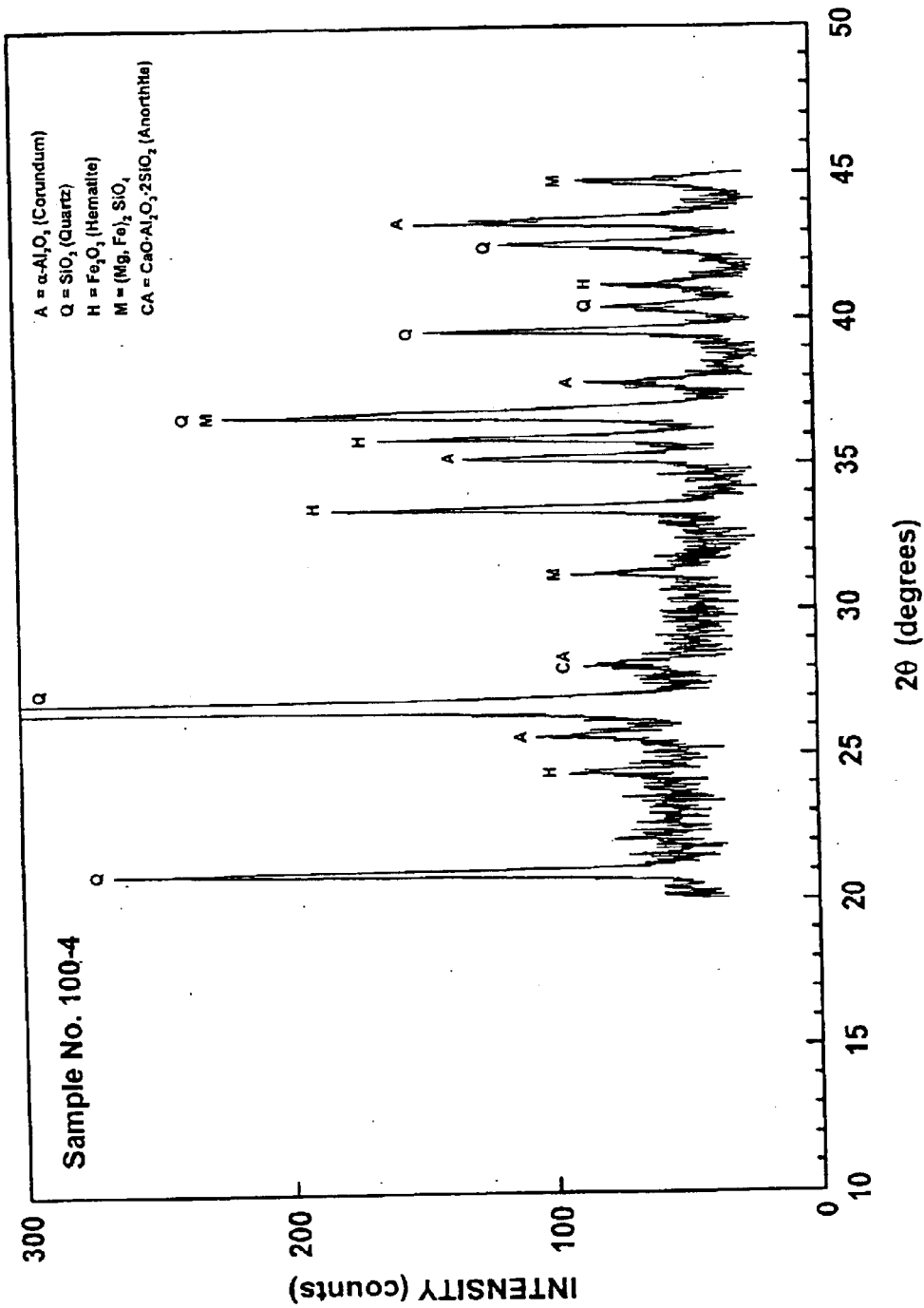
FIG. 15 is an X-ray diffraction plot of a fourth sample of the proppant composition obtained during a second measurement.

Sample No. 100 was prepared with 5 wt % of talc and 2.5 wt % of wollastonite. The XRD pattern for this sample is shown in FIGS. 10–10b and 15, and is similar to the pattern observed for Sample Nos. 94, 97, and 99 in that quartz is the major phase and α-$Al_2O_3$ and hematite ($Fe_2O_3$) are secondary phases.

Sample No. 100 contains the magnesium iron silicate spinel phase $(Mg,Fe)_2SiO_4$. The intensities of the peaks observed in both the 10–90 degree θ scan and the 20–45 degree 2θ scan are similar to those observed in the 94 sample. This is consistent with higher talc content (5 wt %) used in each of these samples.

Only a small amount of the feldspar phase ($CaAl_2SiO_8$, anorthite) is observed in the XRD pattern run from 20–45 degrees 2θ at the slower scan rate. The intensities of the peaks for this phase are similar to those observed in Sample No. 97 and lower than those observed in the 94 and 99 samples. This is consistent with the lower wollastonite content (2.5 wt %) used in the 97 and 100 samples.

Figure 11A:
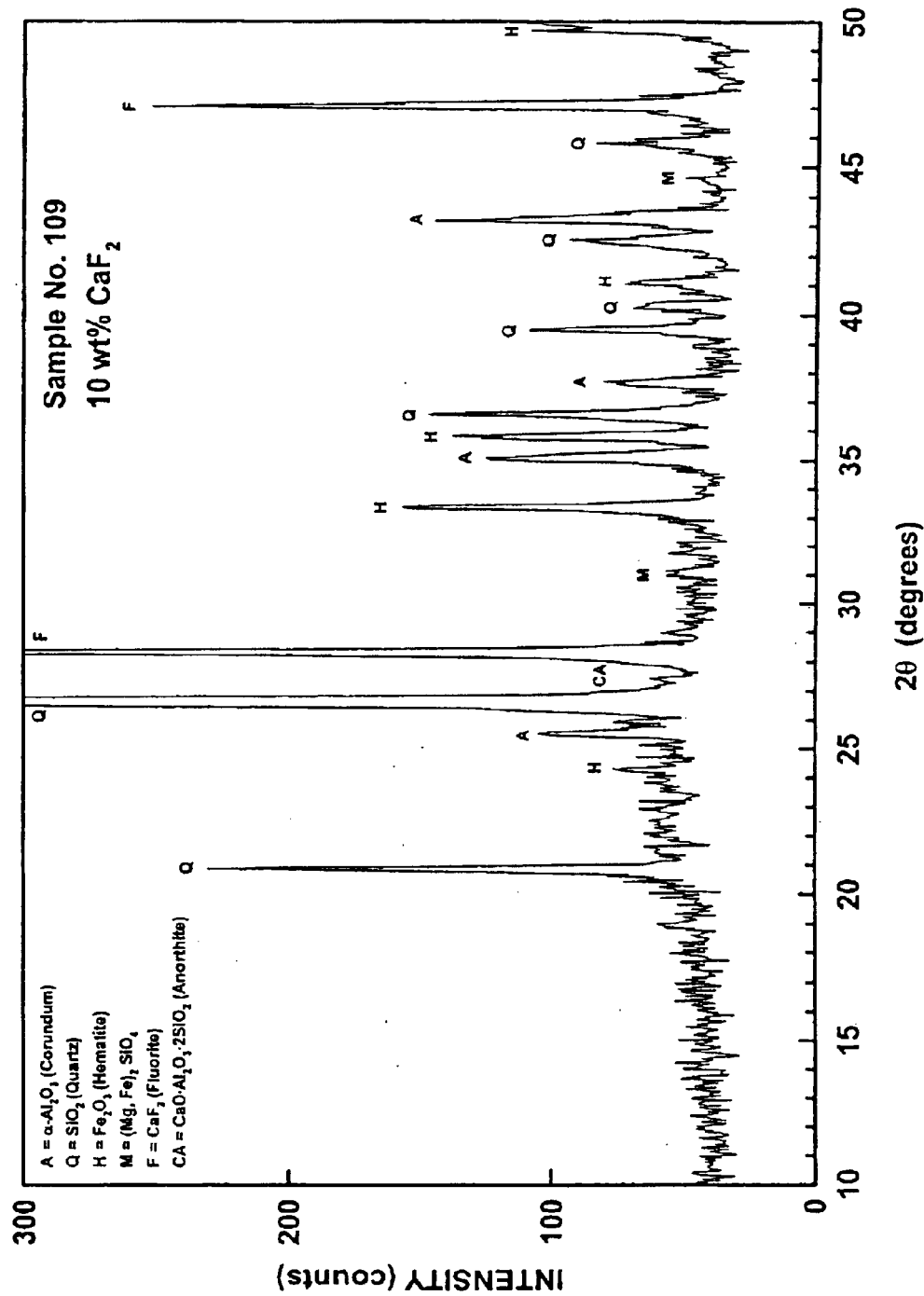
FIGS. 11–11b are X-ray diffraction plots of a fifth sample of the proppant composition obtained during a first measurement.
Figure 11B:
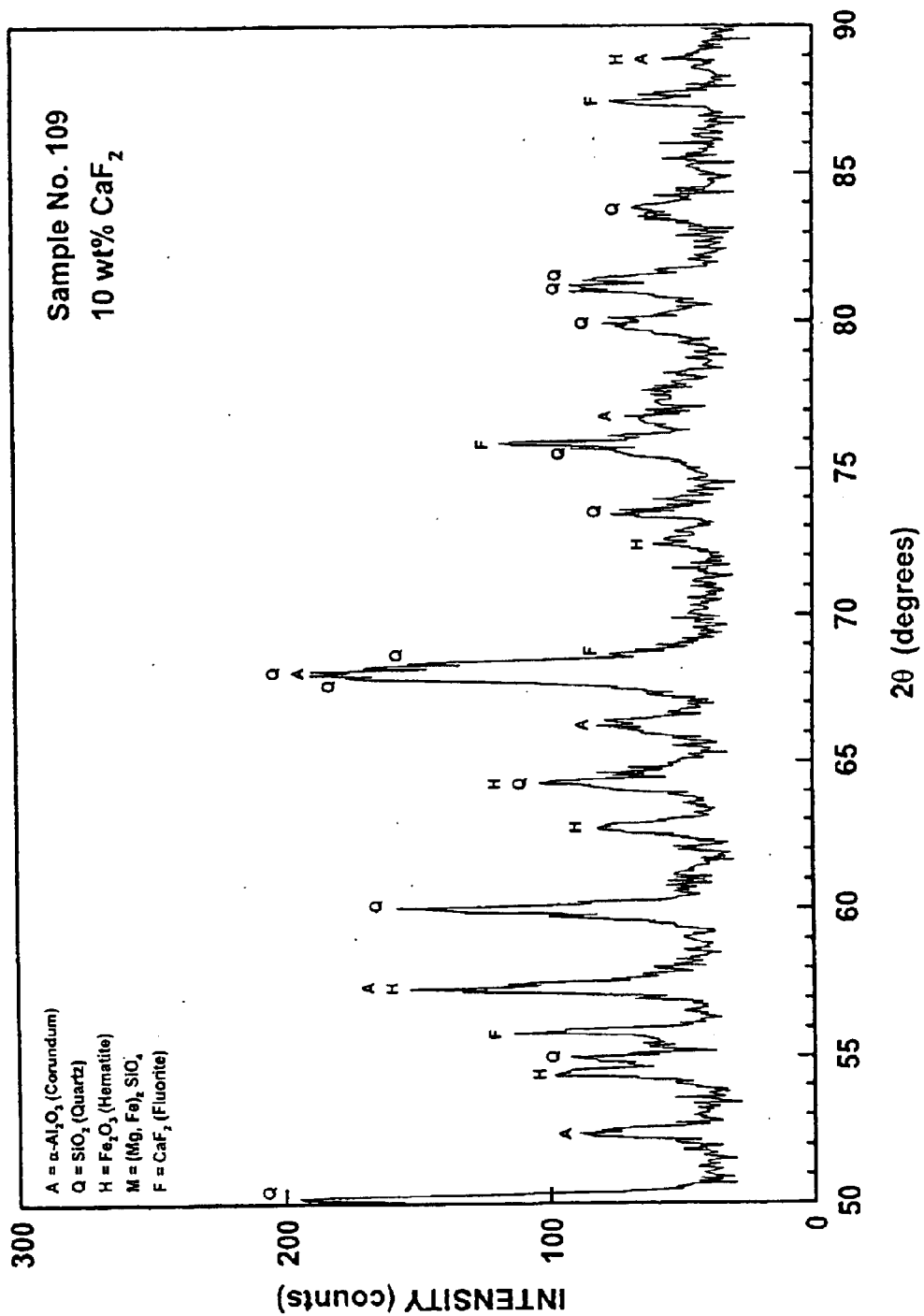
Figure 16:
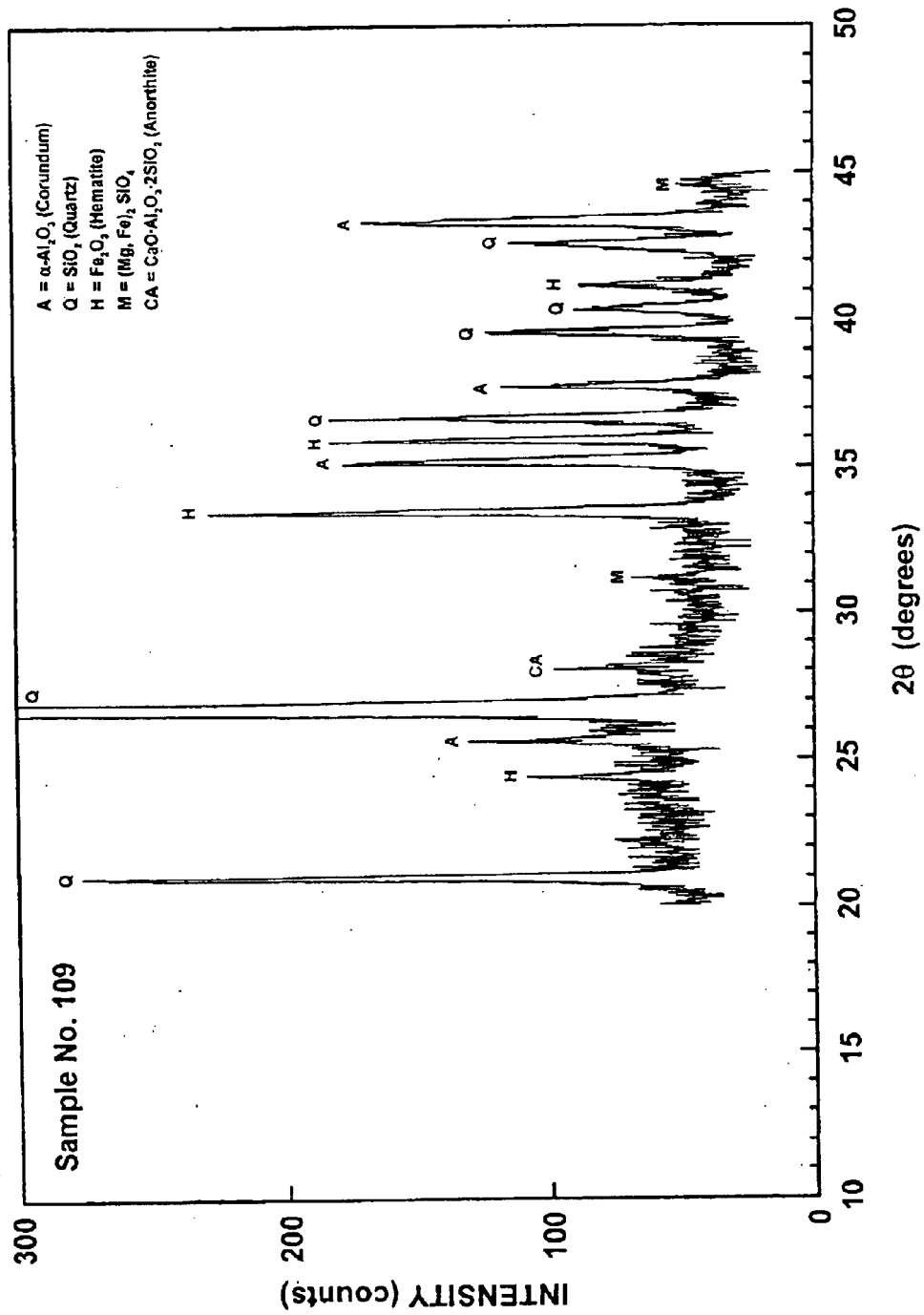
FIG. 16 is an X-ray diffraction plot of a fifth sample of the proppant composition obtained during a second measurement.

Sample No. 109 was prepared with 2 wt % of talc and 2 wt % of wollastonite. The XRD pattern for this sample is shown in FIGS. 11–11b and 16, and is similar to the pattern observed for Sample Nos. 94, 97, 99, and 100 in that quartz is the major phase and $\alpha$-$Al_2O_3$ and hematite ($Fe_2O_3$) are secondary phases.

Sample No. 109 contains only a small amount of the magnesium iron silicate spinel phase $(Mg,Fe)_2SiO_4$ and the feldspar phase ($CaAl_2SiO_8$, anorthite). The peaks associated with these phases can only be observed in the XRD pattern run from 20–45 degrees 2θ at the slower scan rate. The intensities of the peaks for $(Mg,Fe)_2SiO_4$ are similar to those observed in Sample Nos. 97 and 99 which is consistent with the low talc contents used in these samples. The intensity of the peak for $CaAl_2SiO_8$ in the 109 sample is comparable or lower than those observed in Sample Nos. 100 and 99 which is consistent with the low wollastonite content used in the samples.

EXAMPLE

Numerous proppant compositions containing the ingredients and amounts listed below were prepared. A disk of about 1.25 inches in diameter was pressed from 7 to 20 grams of each mix. The disk was then fired and evaluated. The test consisted of scratching the surface with a metal point. If the surface of the disk did not scratch it was considered "Tough," and therefore acceptable.

| | DISK COMPOSITION | | | | | | | FIRING CONDITIONS | | |
|---|---|---|---|---|---|---|---|---|---|---|
| DISK NO. | WT. % BAUXITE | WT. % CLAY | WT. % SAND | WT. % SHALE | WT. % IRON OXIDE | WT. % WOLLASTO-NITE | WT. % TALC | TEMPERATURE °C. | TIME IN MINS. | OBSERVATIONS |
| 62 | 15.00% | 23.50% | 30.00% | 31.50% | 0.00% | 0.00% | 0.00% | | | |
| 63-1 | 0.00% | 48.75% | 48.75% | 0.00% | 0.00% | 2.50% | 0.00% | 1150 | 5 | WEAK |
| 63-2 | 0.00% | 48.75% | 48.75% | 0.00% | 0.00% | 2.50% | 0.00% | 1200 | 5 | WEAK |
| 64-1 | 0.00% | 47.50% | 47.50% | 0.00% | 0.00% | 5.00% | 0.00% | 1200 | 5 | WEAK |
| 64-2 | 0.00% | 47.50% | 47.50% | 0.00% | 0.00% | 5.00% | 0.00% | 1250 | 5 | WEAK |
| 65-1 | 0.00% | 40.00% | 40.00% | 0.00% | 0.00% | 20.00% | 0.00% | 1250 | 5 | |
| 65-2 | 0.00% | 40.00% | 40.00% | 0.00% | 0.00% | 20.00% | 0.00% | 1300 | 5 | |
| 65-3 | 0.00% | 40.00% | 40.00% | 0.00% | 0.00% | 20.00% | 0.00% | 1350 | 5 | T. |
| 65-4 | 0.00% | 40.00% | 40.00% | 0.00% | 0.00% | 20.00% | 0.00% | 1375 | 9 | SL. DEF. |
| 65-5 | 0.00% | 40.00% | 40.00% | 0.00% | 0.00% | 20.00% | 0.00% | 1360 | 9 | T. |
| 65-6 | 0.00% | 40.00% | 40.00% | 0.00% | 0.00% | 20.00% | 0.00% | 1365 | 9 | T. |
| 65-7S | 0.00% | 40.00% | 40.00% | 0.00% | 0.00% | 20.00% | 0.00% | 1365 | 9 | SL. DEF. |
| 66-1 | 0.00% | 100.00% | 0.00% | 0.00% | 0.00% | 0.00% | 0.00% | 1375 | 15 | WEAK |
| 66-2 | 0.00% | 100.00% | 0.00% | 0.00% | 0.00% | 0.00% | 0.00% | 1450 | 12 | WEAK |
| 67-1 | 0.00% | 45.00% | 0.00% | 45.00% | 0.00% | 10.00% | 0.00% | 1300 | 9 | T. |
| 67-2 | 0.00% | 45.00% | 0.00% | 45.00% | 0.00% | 10.00% | 0.00% | 1350 | | T. |
| 67-3 | 0.00% | 45.00% | 0.00% | 45.00% | 0.00% | 10.00% | 0.00% | 1300 | 10 | T. |
| 67-4 | 0.00% | 45.00% | 0.00% | 45.00% | 0.00% | 10.00% | 0.00% | 1325 | 9 | SL. T. |
| 68-1 | 0.00% | 45.00% | 45.00% | 0.00% | 0.00% | 10.00% | 0.00% | 1350 | 6 | |
| 68-2 | 0.00% | 45.00% | 45.00% | 0.00% | 0.00% | 10.00% | 0.00% | 1350 | 9 | |
| 68-3 | 0.00% | 45.00% | 45.00% | 0.00% | 0.00% | 10.00% | 0.00% | 1375 | 10 | T. |
| 68-4 | 0.00% | 45.00% | 45.00% | 0.00% | 0.00% | 10.00% | 0.00% | 1375 | 10 | T. |
| 69-1 | 0.00% | 40.00% | 0.00% | 40.00% | 0.00% | 20.00% | 0.00% | 1250 | | |
| 69-2 | 0.00% | 40.00% | 0.00% | 40.00% | 0.00% | 20.00% | 0.00% | 1300 | | T. |
| 70-1 | 0.00% | 37.50% | 37.50% | 0.00% | 0.00% | 25.00% | 0.00% | 1300 | 12 | T. |
| 70-2 | 0.00% | 37.50% | 37.50% | 0.00% | 0.00% | 25.00% | 0.00% | 1350 | 10 | DEFORMED |
| 71-1 | 0.00% | 37.50% | 0.00% | 37.50% | 0.00% | 25.00% | 0.00% | 1300 | 15 | DEFORMED |
| 71-2 | 0.00% | 37.50% | 0.00% | 37.50% | 0.00% | 25.00% | 0.00% | 1275 | 10 | DEFORMED |
| 71-3 | 0.00% | 37.50% | 0.00% | 37.50% | 0.00% | 25.00% | 0.00% | 1250 | 10 | SL. DEF. |
| 72-1 | 0.00% | 35.00% | 35.00% | 0.00% | 0.00% | 30.00% | 0.00% | 1300 | 11 | TOUGH |
| 72-2 | 0.00% | 35.00% | 35.00% | 0.00% | 0.00% | 30.00% | 0.00% | 1325 | 10 | SL. DEF. |
| 72-3 | 0.00% | 35.00% | 35.00% | 0.00% | 0.00% | 30.00% | 0.00% | 1275 | 9 | T. |
| 73-1 | 0.00% | 35.00% | 0.00% | 35.00% | 0.00% | 30.00% | 0.00% | 1200 | 11 | |
| 73-2 | 0.00% | 35.00% | 0.00% | 35.00% | 0.00% | 30.00% | 0.00% | 1225 | 10 | V.T. |
| 74-1 | 0.00% | 33.33% | 0.00% | 33.33% | 0.00% | 33.33% | 0.00% | 1200 | 10 | |
| 74-2 | 0.00% | 33.33% | 0.00% | 33.33% | 0.00% | 33.33% | 0.00% | 1250 | 12 | V.T. |
| 74-3 | 0.00% | 33.33% | 0.00% | 33.33% | 0.00% | 33.33% | 0.00% | 1225 | 6 | V.T. |
| 74-4 | 0.00% | 33.33% | 0.00% | 33.33% | 0.00% | 33.33% | 0.00% | 1150 | 10 | |
| 75-1 | 33.33% | 0.00% | 0.00% | 33.33% | 0.00% | 33.33% | 0.00% | 1225 | 5 | V.T. |
| 75-2 | 33.33% | 0.00% | 0.00% | 33.33% | 0.00% | 33.33% | 0.00% | 1200 | 10 | V.T. |
| 75-3 | 33.33% | 0.00% | 0.00% | 33.33% | 0.00% | 33.33% | 0.00% | 1150 | 10 | |
| 75-4 | 33.33% | 0.00% | 0.00% | 33.33% | 0.00% | 33.33% | 0.00% | 1175 | 10 | SL. DEF. |
| 76-1 | 0.00% | 40.00% | 40.00% | 0.00% | 0.00% | 0.00% | 20.00% | 1300 | 10 | |
| 76-2 | 0.00% | 40.00% | 40.00% | 0.00% | 0.00% | 0.00% | 20.00% | 1350 | 7 | |
| 76-3 | 0.00% | 40.00% | 40.00% | 0.00% | 0.00% | 0.00% | 20.00% | 1400 | 10 | |
| 77-1 | 0.00% | 42.50% | 42.50% | 0.00% | 0.00% | 10.00% | 5.00% | 1300 | 10 | |
| 77-2 | 0.00% | 42.50% | 42.50% | 0.00% | 0.00% | 10.00% | 5.00% | 1350 | 10 | DEL. |
| 77-3 | 0.00% | 42.50% | 42.50% | 0.00% | 0.00% | 10.00% | 5.00% | 1350 | 11 | |
| 77-4 | 0.00% | 42.50% | 42.50% | 0.00% | 0.00% | 10.00% | 5.00% | 1400 | 9 | SL. DEF. |
| 78-1 | 0.00% | 33.33% | 33.33% | 0.00% | 0.00% | 33.33% | 0.00% | 1250 | 10 | SL. DEF. |
| 78-2 | 0.00% | 33.33% | 33.33% | 0.00% | 0.00% | 33.33% | 0.00% | 1225 | 6 | |
| 78-3 | 0.00% | 33.33% | 33.33% | 0.00% | 0.00% | 33.33% | 0.00% | 1275 | 9 | DEF. |
| 79-1 | 33.33% | 0.00% | 33.33% | 0.00% | 0.00% | 33.33% | 0.00% | 1150 | 11 | |
| 79-2 | 33.33% | 0.00% | 33.33% | 0.00% | 0.00% | 33.33% | 0.00% | 1200 | 10 | SL. DEF. |
| 79-3 | 33.33% | 0.00% | 33.33% | 0.00% | 0.00% | 33.33% | 0.00% | 1225 | 10 | DEF. |

-continued

| | | | DISK COMPOSITION | | | | | FIRING CONDITIONS | | |
|---|---|---|---|---|---|---|---|---|---|---|
| DISK NO. | WT. % BAUXITE | WT. % CLAY | WT. % SAND | WT. % SHALE | WT. % IRON OXIDE | WT. % WOLLASTONITE | WT. % TALC | TEMPERATURE ° C. | TIME IN MINS. | OBSERVATIONS |
| 80-1 | 38.00% | 0.00% | 42.00% | 0.00% | 0.00% | 20.00% | 0.00% | 1250 | 10 | T. |
| 80-2 | 38.00% | 0.00% | 42.00% | 0.00% | 0.00% | 20.00% | 0.00% | 1300 | 8 | T. |
| 80-3 | 38.00% | 0.00% | 42.00% | 0.00% | 0.00% | 20.00% | 0.00% | 1350 | 10 | V. DEF. |
| 80-4 | 38.00% | 0.00% | 42.00% | 0.00% | 0.00% | 20.00% | 0.00% | 1325 | 10 | DEF. |
| 81-1 | 38.00% | 0.00% | 47.00% | 0.00% | 0.00% | 15.00% | 0.00% | 1325 | 10 | SL. T. |
| 81-2 | 38.00% | 0.00% | 47.00% | 0.00% | 0.00% | 15.00% | 0.00% | 1350 | 10 | DEF. |
| 81-3 | 38.00% | 0.00% | 47.00% | 0.00% | 0.00% | 15.00% | 0.00% | 1350 | 10 | DEF. |
| 81-4 | 38.00% | 0.00% | 47.00% | 0.00% | 0.00% | 15.00% | 0.00% | 1350 | 8 | |
| 82-1 | 30.00% | 0.00% | 50.00% | 0.00% | 0.00% | 20.00% | 0.00% | 1350 | 11 | |
| 82-2 | 30.00% | 0.00% | 50.00% | 0.00% | 0.00% | 20.00% | 0.00% | 1375 | 7 | T./DEF. |
| 82-3 | 30.00% | 0.00% | 50.00% | 0.00% | 0.00% | 20.00% | 0.00% | 1400 | — | |
| 83-1 | 30.00% | 0.00% | 50.00% | 0.00% | 0.00% | 15.00% | 5.00% | 1275 | 10 | T. |
| 83-2 | 30.00% | 0.00% | 50.00% | 0.00% | 0.00% | 15.00% | 5.00% | 1300 | 6 | T. |
| 83-3 | 30.00% | 0.00% | 50.00% | 0.00% | 0.00% | 15.00% | 5.00% | 1300 | 8 | V.T. |
| 83-4 | 30.00% | 0.00% | 50.00% | 0.00% | 0.00% | 15.00% | 5.00% | 1325 | 11 | V.T. |
| 83-5 | 30.00% | 0.00% | 50.00% | 0.00% | 0.00% | 15.00% | 5.00% | 1350 | 8 | T. |
| 84-1 | 30.00% | 0.00% | 55.00% | 0.00% | 0.00% | 15.00% | 0.00% | 1300 | 10 | T. |
| 84-2 | 30.00% | 0.00% | 55.00% | 0.00% | 0.00% | 15.00% | 0.00% | 1325 | 9 | V. T/SL DEF. |
| 84-3 | 30.00% | 0.00% | 55.00% | 0.00% | 0.00% | 15.00% | 0.00% | 1350 | 10 | |
| 85-1 | 30.00% | 0.00% | 60.00% | 0.00% | 0.00% | 10.00% | 0.00% | 1350 | 8 | T. |
| 85-2 | 30.00% | 0.00% | 60.00% | 0.00% | 0.00% | 10.00% | 0.00% | 1375 | 12 | BL.?/TOUGH |
| 85-3 | 30.00% | 0.00% | 60.00% | 0.00% | 0.00% | 10.00% | 0.00% | 1250 | 11 | T. |
| 85-4 | 30.00% | 0.00% | 60.00% | 0.00% | 0.00% | 10.00% | 0.00% | 1300 | 9 | SL. T. |
| 85-5 | 30.00% | 0.00% | 60.00% | 0.00% | 0.00% | 10.00% | 0.00% | 1225 | 6 | T. |
| 86-1 | 30.00% | 0.00% | 45.00% | 15.00% | 0.00% | 10.00% | 0.00% | 1300 | 10 | T. |
| 86-2 | 30.00% | 0.00% | 45.00% | 15.00% | 0.00% | 10.00% | 0.00% | 1350 | 14 | BL. |
| 87-1 | 30.00% | 0.00% | 30.00% | 30.00% | 0.00% | 10.00% | 0.00% | 1250 | 16 | DEF. |
| 87-2 | 30.00% | 0.00% | 30.00% | 30.00% | 0.00% | 10.00% | 0.00% | 1200 | 9 | T. |
| 88-1 | 30.00% | 0.00% | 30.00% | 30.00% | 0.00% | 0.00% | 10.00% | 1200 | 16 | WEAK |
| 88-2 | 30.00% | 0.00% | 30.00% | 30.00% | 0.00% | 0.00% | 10.00% | 1250 | 10 | SL. T. |
| 88-3 | 30.00% | 0.00% | 30.00% | 30.00% | 0.00% | 0.00% | 10.00% | 1300 | 8 | BL. |
| 88-4 | 30.00% | 0.00% | 30.00% | 30.00% | 0.00% | 0.00% | 10.00% | 1300 | 9 | SL. T./DEF. |
| 88-5 | 30.00% | 0.00% | 30.00% | 30.00% | 0.00% | 0.00% | 10.00% | 1275 | 10 | SL. T./DEF. |

BL. = BLOATED
DEF. = DEFORMED
DEL. = DELAMINATED
DL. = SLIGHTLY
T. = TOUGH
V. = VERY

COMPARATIVE EXAMPLE

Table VII is a selected list of proppant patents based upon the alumina content, source of alumina, silica phase wherein specified, and silica source.

TABLE VII

| | PROPPANT MATERIALS | | | | | |
|---|---|---|---|---|---|---|
| Inventor | Alumina Content | Silica Content | Alumina Phase | Alumina Source | Silica Phase | Silica Source |
| Cooke, U.S. Pat. No. 4,068,718 | 85% | | | Bauxite | | Bauxite |
| Fitzgibbon U.S. Pat. No. 4,427,068 | 50%–90% | | | | | |
| Lunghofer | 40%–60% | | | Kaolin | | Kaolin |
| Rumpf 4,977,116 4,921,820 | 35%–40% | | | Kaolin | <5% α-quartz | Microcrystalline silica |
| Sweet 5,188,175 | 25%–40% | >60% | | Kaolin-Light weight aggregate | | Kaolin-Light weight aggregate |

TABLE VII-continued

PROPPANT MATERIALS

| Inventor | Alumina Content | Silica Content | Alumina Phase | Alumina Source | Silica Phase | Silica Source |
|---|---|---|---|---|---|---|
| Present Invention | 10%–25% | >60% | α-alumina | Bauxite | α-quartz | Sand (α-quartz), Clay, & Bauxite |

The present invention differs significantly from U.S. Pat. No. 5,188,175, Sweet in both the area of raw materials, (see Table VIII), the phases in the sintered proppant and the conductivity of the resultant proppant containing a significantly lower level of alumina.

TABLE VIII

RAW MATERIALS

| Sweet U.S. Pat. No. 5,188,175 | Kaolin | Light Weight Aggregate | | | |
|---|---|---|---|---|---|
| Present Invention | Bauxite | Shale | Quartz | Wollastonite | Talc |

The present invention incorporates a combination of Wollastonite and Talc in addition to the bauxite, shale, and quartz. The addition of the Wollastonite and Talc introduce additional crystalline phases into the sintered proppant body. A comparison of crystalline phases in the U.S. Pat. No. 5,188,175 (Sweet) and the present invention as shown in Table IX, and a comparison of elemental analyses is shown in Table X.

TABLE IX

| | Primary | Secondary | | Terietiary | |
|---|---|---|---|---|---|
| Sweet U.S. Pat. No. 5,188,175 | | Not recorded in U.S. Patent | | | |
| Present Invention | α-Quartz | α-Alumina | Hematite | Magnesium-Iron-silicate | Anorthite | permits the use of other fluids in the evaluation of proppants. A more stringent test was used in the evaluation of the proppant of the present invention by substituting a 2% KCI at 250° F. in place of water at 75° F. The substitution of water with a 2% KCI solution results in a more stringent test of the proppant and reduces the conductivity.

U.S. Pat. No. 5,188,175 indicated that the test was carried out with the test fluid at 75° F. and the total test time was less than 4 hours. These conditions would yield a higher conductivity than the conditions under which the present invention was tested. Nevertheless the proppant under the present invention yielded a conductivity equal to or greater than the conductivities reported for both the 27% alumina and the 37% alumina proppant tested under less stringent conditions as reported in U.S. Pat. No. 5,188,175.

The conductivity of proppant produced under this invention compares quite favorably with a proppant containing an alumina content of 49%. The data sheet for the Econo-Prop produced by Carbo Ceramics lists a conductivity of 2,500 md-ft for a proppant with a size of 20/40 mesh. The proppant of this invention has a conductivity of 2372 md-ft @ 8,000 psi after 50 hours in 2% KCI. A 16/20 mesh sample of this invention has a conductivity of 4398 md-ft when the same type fluid is heated to 250° C. for 50 hours @ 8,000 psi.

TABLE X

TYPICAL ELEMENTAL ANALYSIS

| | $Al_2O_3$ | $SiO_2$ | $Fe_2O_3$ | CaO | $CaCO_3$ | MgO | $K_2O$ | $TiO_2$ | Other |
|---|---|---|---|---|---|---|---|---|---|
| Sweet U.S. Pat. No. 5,188,175 | 25.9 | 62.5 | 4.6 | | 1.0 | 1.4 | | 1.7 | 2.9 |
| Present Invention | | | | | | | | | |
| Mix No. 97 | 20.6 | 64 | 7.9 | 1.8 | | 1.0 | 2.4 | 0.9 | 1.4 |
| Mix No. 94 | 20 | 64.5 | 7.6 | 3.2 | | 1.8 | 2.3 | 0.9 | 1.4 |
| Mix No. 99 | 21.1 | 63.7 | 8.3 | 3.2 | | 0.8 | 2.1 | 0.9 | 1.4 |
| Mix No. 100 | 21.1 | 64.1 | 8.4 | 2 | | 0.6 | 2.1 | 0.9 | 1.4 |
| Mix No. 109 | 21.9 | 64.1 | 8.6 | 1.7 | | 0.6 | 2.2 | 0.9 | 1.4 |

The proppant made according to Mix No. 97 of the present invention had a conductivity of 2.372 md-ft at 2.0 lb/sq ft as measured by Stim Labs, Houston, Tex. The conductivity of the present invention was measured in accordance with API PR-61. In API PR-61 Section 1, Paragraph 1.2, the normal procedure calls for the use of deionized or distilled water at 75° F. The same section The raw materials used in the production of the proppant of this invention do not require thermal treatment prior to their formation into spheres. Other patents require the dehydration or the raw materials and or crystalline phase change of the major elements or the restriction of quartz to 2%–5% in the raw material and or in the sintered proppant. Many of the previous U.S. Patents require thermal treatment of the raw materials, restrict the level of iron oxide and or quartz to <5%, and have mullite and crystobalite an the major phases. U.S. Pat. No. 4,977,116 (Rumpf) requires the use of microcrystalline silica to limit the α-quartz in the sintered proppant body. U.S. Pat. No. 4,921,820 (Rumpf) also limits the quartz to <5% and in addition the proppant contains between about 43 weight % to about 58 weight % alumina.

The thermal processing or sintering of the proppant body of the present invention also has the advantage of permitting the reheating of the proppant at near the sintering temperature to increase the proppant strength. For instance, a 16/20 mesh size sample heated to 1150° C. for one hour was reheated at 1160° C. for one hour. A twenty (20) gram sample of the proppant heated at 1150° C. for one hour and then placed in a 1.25 inch diameter crush cell and subjected to 7,500 psi pressure yielded a percent crush of >20% on a 20 mesh screen. A sample of the material previously heated to 1150° C. was reheated to 1160° C., a twenty (20) gram sample was placed in the same 1.25 inch diameter crush cell and subjected to 7,500 psi yielded <20% on a 20 mesh screen.

While the foregoing description has described the best mode currently contemplated of practicing the invention, the scope of the invention is not intended to be limited by this description. For example, the starting components for the proppant composition, namely, the bauxite, quartz, shale, wollastonite and talc can be obtained from any readily available source of similar raw materials. Furthermore, the specific devices utilized in the mixing and preparation of the sintered proppant particles, such as the rotary mixer, the fluidized bed, and the microwave sintering apparatus can be altered or substituted for as necessary in order to form the proppant particles.

Various alternative combinations of the pellet ingredients are contemplated as being included within the scope of the following claims particularly pointing out and distinctly claming the present invention.

We claim:

1. A gas and oil well proppant comprising a mixture of:
   a) from about 1% by weight to about 10% by weight talc;
   b) from about 1% by weight to about 10% by weight wollastonite;
   c) from about 5% by weight to about 33% by weight bauxite;
   d) from about 10% by weight to about 65% by weight quartz; and
   e) from about 10% by weight to about 65% by weight shale;
   wherein the mixture has an alumina content of less than about 25% by weight, and a silica content of greater than about 45% by weight.

2. The proppant of claim 1 wherein the bauxite, quartz and shale are present in equal amounts.

3. The proppant of claim 1 wherein the overall percentage of silica in the mixture is from about 45% by weight to about 70% by weight.

4. The proppant of claim 3 wherein the overall percentage of silica in the mixture is from about 50% by weight to about 65% by weight.

5. The proppant of claim 1 wherein the shale contains from about 5% by weight to about 10% by weight potassium oxide and from about 75% by weight to about 90% by weight silica.

6. The proppant of claim 1 wherein the mixture contains from about 3% by weight to about 10% by weight $Fe_2O_3$.

7. The proppant of claim 1 wherein the mixture contains from about 15% by weight to 25% by weight $Al_2O_3$.

8. The proppant of claim 1 wherein the bauxite comprises from about 40% by weight to 70% by weight $Al_2O_3$ and from about 15% by weight to about 35% by weight $Fe_2O_3$.

9. The proppant of claim 1 wherein the bauxite is uncalcined.

10. The proppant of claim 1 wherein the mixture comprises pellets having a diameter from about 0.5 mm to about 2 mm.

11. The proppant of claim 1 wherein the combined percentage of the talc and wollastonite in the mixture is less than about 10% by weight of the mixture.

12. A proppant composition for use in gas and oil wells, comprising a mixture of:
    (a) a hydraulic fluid; and
    (b) a proppant particulate material comprising a mixture of
        (1) from about 1% by weight to about 10% by weight talc;
        (2) from about 1% by weight to about 10% by weight wollastonite;
        (3) from about 5% by weight to about 33% by weight bauxite;
        (4) from about 10% by weight to about 65% by weight quartz; and
        (5) from about 10% by weight to about 65% by weight shale;
    wherein the mixture has an alumina content of less than about 25% by weight, and a silica content of greater than about 45% by weight.

13. The proppant composition of claim 12 wherein the bauxite, quartz and shale are present in equal amounts.

14. The proppant composition of claim 12 wherein the overall percentage of silica in the mixture is from about 45% by weight to about 70% by weight.

15. The proppant composition of claim 14 wherein the overall percentage of silica in the mixture is from about 50% by weight to about 65% by weight.

16. The proppant composition of claim 12 wherein the shale contains from about 5% by weight to about 10% by weight potassium oxide and from about 75% by weight to about 90% by weight silica.

17. The proppant composition of claim 12 wherein the mixture contains from about 3% by weight to about 10% by weight $Fe_2O_3$.

18. The proppant composition of claim 12 wherein the mixture contains from about 15% by weight to 25% by weight $Al_2O_3$.

19. The proppant composition of claim 12 wherein the bauxite comprises from about 40% by weight to 70% by weight $Al_2O_3$ and from about 15% by weight to about 35% by weight $Fe_2O_3$.

20. The proppant composition of claim 13 wherein the bauxite is uncalcined.

21. The proppant composition of claim 12 wherein the mixture comprises pellets having a diameter from about 0.5 mm to about 2 mm.

22. The proppant composition of claim 12 wherein the combined percentage of the talc and wollastonite in the mixture is less than about 10% by weight of the mixture.

23. The proppant composition of claim 1, wherein said hydraulic fluid is selected from the group consisting of oil, water and mixtures thereof.

24. A method for forming a proppant formed of a composite, sintered, generally spherical pellets, the method comprising the steps of:
    a) preparing a mixture of equal parts of sized powders of bauxite, quartz, shale, and adding a binder of talc and wollastonite to said mixture in an amount of less than about 10% by weight of the mixture;

b) adding an amount of starch and water to the mixture;

c) forming the mixture into a number of generally spherical particles; and d) heating the particles to sinter the particles.

25. The method of claim 24 wherein the step of forming the mixture into a number of spherical particles further comprises the steps of:

a) placing the mixture into a high intensity mixer;

b) operating the mixer; and c) removing the particles the mixer.

26. The method of claim 25 wherein the step of operating the mixer further comprises the steps of:

a) running the mixer at a first speed to thoroughly homogenize the mixture; and b) running the mixer at a second speed to form the particles into a desired size.

27. The method of claim 26 wherein the first speed is faster than the second speed.

28. The method of claim 24 wherein the step of forming the mixture into a number of spherical particles further comprises the steps of:

a) forming an aqueous feed suspension comprising the mixture of the starch and the water;

b) continuously atomizing the feed suspension into a layer of partly dried particles fluidized in a stream of drying air;

c) continuously recovering particles from the layer;

d) continuously separating the recovered particles into oversized, undersized and product fractions, making allowance for shrinkage in the subsequent sintering operation; and e) continuously recycling material selected from the group consisting of undersized fractions, relative fine product fractions, ground oversize fractions, and ground product fractions to the layer of fluidized particles at a site a substantial distance from the location where recovering of particles takes place, measured along the flow path of the particles.

29. The method of claim 28 wherein the material recycled in step (e) has been ground to a desired particle size distribution.

30. The method of claim 28 wherein the stream of drying air fluidizing the particles has a velocity of 0.5 m/s to 1.5 m/s.

31. The method of claim 24 further comprising the step of drying the particles to remove water after forming the mixture into the particles.

32. The method of claim 31 wherein the step of drying the particles further comprises the steps of:

a) placing the particles into a container having an open top; and b) allowing the particles to dry under ambient conditions.

33. The method of claim 31 wherein the step of drying the particles further comprises the steps of:

a) placing the particles into a rotary dryer; and b) operating the dryer.

34. The method of claim 24 wherein the step of heating the particles to sinter the particles comprises the steps of:

a) placing an amount of the dried particles into a rotary kiln; and b) heating the particles to a sintering temperature for a specified time to sinter the particles into the pellets.

35. The method of claim 34 wherein the temperature to which the particles are heated is between 1100° C. and 1200° C.

36. The method of claim 24 wherein the step of heating the particles to sinter the particles comprises the steps of:

a) feeding the particles into an inlet of a microwave sintering apparatus; and b) irradiating the particles as they pass through the apparatus to sinter the particles and form the pellets.

37. The method of claim 36 wherein the temperature to which the particles are heated is between 1100 and 1200° C.

38. The method of claim 36 wherein the microwave sintering apparatus is a continuous feed apparatus.

39. The method of claim 38 wherein the microwave sintering apparatus is a fluidized microwave bed.

40. A method of increasing the permeability of a fracture of a gas or oil well by pumping the proppant of claim 1 into the fracture.

41. A method of increasing the permeability of a fracture of a gas or oil well by pumping a proppant formed by the method of claim 24 into the fracture.

* * * * *